US008681668B2

(12) United States Patent
Fernández Gutiérrez

(10) Patent No.: US 8,681,668 B2
(45) Date of Patent: Mar. 25, 2014

(54) METHODS AND APPARATUS FOR TRANSMITTING MULTICAST TRAFFIC IN A DATA NETWORK

(75) Inventor: Álvaro Fernández Gutiérrez, Barcelona (ES)

(73) Assignee: Media Patents, S.L. (ES)

( * ) Notice: Subject to any disclaimer, the term of this patent is extended or adjusted under 35 U.S.C. 154(b) by 595 days.

(21) Appl. No.: 12/895,756

(22) Filed: Sep. 30, 2010

(65) Prior Publication Data

US 2011/0085548 A1    Apr. 14, 2011

(30) Foreign Application Priority Data

Oct. 9, 2009   (ES) .................................. 200930825

(51) Int. Cl.
*H04L 12/28*    (2006.01)
(52) U.S. Cl.
USPC ............................................ 370/290; 370/351
(58) Field of Classification Search
None
See application file for complete search history.

(56) References Cited

U.S. PATENT DOCUMENTS

| | | | | |
|---|---|---|---|---|
| 7,016,351 | B1* | 3/2006 | Farinacci et al. | 370/392 |
| 2004/0252690 | A1* | 12/2004 | Pung et al. | 370/390 |
| 2006/0083263 | A1* | 4/2006 | Jagadeesan et al. | 370/487 |
| 2006/0126613 | A1* | 6/2006 | Zweig | 370/389 |
| 2006/0127091 | A1* | 6/2006 | Yoo et al. | 398/69 |
| 2007/0237185 | A1* | 10/2007 | Pereira et al. | 370/503 |
| 2007/0250635 | A1* | 10/2007 | Hamilton et al. | 709/231 |
| 2007/0286093 | A1* | 12/2007 | Cai et al. | 370/254 |
| 2009/0013362 | A1* | 1/2009 | Liu et al. | 725/110 |
| 2009/0219934 | A1* | 9/2009 | Deshpande | 370/390 |
| 2010/0088426 | A1* | 4/2010 | Takemura et al. | 709/231 |
| 2011/0119703 | A1* | 5/2011 | Schlack et al. | 725/34 |

OTHER PUBLICATIONS

B. Cain et al., "Internet Group Management Protocol, Version 3," Engineering Task Force, Network Working Group, Request for Comments 3376, Oct. 2002; currently available at Internet address http://tools.ietf.org/html/rfc3376.

(Continued)

*Primary Examiner* — Phirin Sam
(74) *Attorney, Agent, or Firm* — Cantor Colburn LLP

(57) ABSTRACT

A method including receiving in a first network interface of a router a first request for a first type of multicast traffic in a first multicast routing protocol, storing in the router a second type of multicast traffic, transmitting from the router using a second multicast routing protocol requests for the first and second types of multicast traffic, receiving in the router the first and second types of multicast traffic comprising first and second IP packets, respectively, modifying in the router the IP source address and/or the IP multicast destination address of the second IP packets so that the addresses of the second IP packets are the same as the first IP packets of the first type of multicast traffic and transmitting the first IP packets and the modified second IP packets via the first network interface, where the router transmits in a first time interval the first IP packets, transmits in a second time interval the modified second IP packets, and transmits in a third time interval the remaining portion of the first IP packets.

129 Claims, 13 Drawing Sheets

(56) References Cited

OTHER PUBLICATIONS

R. Vida et al., "Multicast Listener Discovery Version 2 (MLDv2) for IPv6," Engineering Task Force, Network Working Group, Request for Comments 3810, Jun. 2004; currently available at Internet address http://tools.ietf.org/html/rfc3810.

B. Fenner et al., "Protocol Independent Multicast—Sparse Mode (PIM-SM): Protocol Specification (Revised)," Engineering Task Force, Network Working Group, Request for Comments 4601, Aug. 2006; currently available at Internet address http://tools.ietf.org/html/rfc4601.

M. Christensen et al., "Considerations for Internet Group Management Protocol (IGMP) and Multicast Listener Discovery (MLD) Snooping Switches," Engineering Task Force, Network Working Group, Request for Comments 4541, May 2006; currently available at Internet address http://tools.ietf.org/html/rfc4541.

* cited by examiner

METHODS AND APPARATUS FOR TRANSMITTING MULTICAST TRAFFIC IN A DATA NETWORK

CROSS-REFERENCE TO RELATED APPLICATIONS

This application claims priority to Spanish Patent Application No. P200930825, filed Oct. 9, 2009 which is incorporated herein by reference.

TECHNICAL FIELD

The present developments relate to multi-broadcast or multicast technology in data networks.

BACKGROUND

Multicast technology makes it possible to send data from a single source to many recipients through a data network, without having to set up unicast communication involving one-to-one individual communication between the source and each of the recipients. To that end a source sends data, in data packet form, to a single address associated to a multicast group to which the equipment interested in being recipients of the data sending can subscribe. This address, referred to as a multicast address or also as a multicast group address, is an IP (Internet Protocol) address chosen within a range that is reserved for multicast applications. The data packets which have been sent by the source to the multicast address are then replicated in the different network routers so that they can reach the recipients that have joined the multicast group.

In wired data networks, such as networks that use ADSL or Ethernet networks, the use of multicast technology has been widespread in recent years due to Internet TV or IPTV.

The recipients which receive data in a multicast group are usually equipment connected to the data network by means of a proxy or a router. Hereinafter, the common term host will be used to refer to the recipient equipment. A host can be, for example, a computer, a set-top box (digital signal decoder) connected to a television set, a mobile phone, mobile devices, etc.

When a host wants to receive the information sent by one or several sources of a multicast group, it sends to the closest router, or to an intermediate proxy, a subscription message to request the multicast traffic so that the router transmits to it the data arriving through the data network and which has been sent by the sources of the multicast group. Likewise, when a host wishes to stop receiving data sending in the multicast group, it sends to the router or to the proxy an unsubscribe message to stop receiving them.

Today the messages exchanged between a host and the closest router to manage membership to a multicast group use the IGMP protocol (Internet Group Management Protocol) or the MLD (Multicast Listener Discovery) protocol, according to whether or not the router works with version 4 (IPv4) or version 6 (IPv6) of the IP protocol (Internet Protocol), respectively. When there is a proxy between the host and the router, the proxy also uses the IGMP/MLD protocols to exchange with the host, the closest router or other intermediate proxy, the multicast group membership messages. In these cases, the proxy can receive from different hosts requests to subscribe to or to unsubscribe from a multicast group, and it assembles them to thus reduce IGMP/MLD message traffic it sends to the router. Hereinafter, the generic term "IGMP proxy" will be used to designate a proxy that uses IGMP/MLD protocols.

In addition, routers exchange messages with one another for the purpose of defining the routing which allows efficiently routing the data from the sources to the hosts that have requested the multicast traffic. To that end, the routers use specific protocols, including the very well known PIM-SM (Protocol Independent Multicast-Sparse Mode).

In summary, the routers receive from the hosts, in the form of IGMP/MLD messages, information specifying which multicast groups they want to receive traffic from, and they communicate with other routers, for example by means of the PIM-SM protocol, for the purpose of setting up a routing which takes the traffic requested by the hosts to such hosts.

All the mentioned protocols are defined and documented by the Internet Engineering Task Force (IETF).

The latest version of the IGMP protocol version currently being used is IGMPv3, which is described in the RFC 3376 specifications published on line by the IETF (B. Cain et al., Engineering Task Force, Network Working Group, Request for Comments 3376, October 2002; currently available at Internet address http://tools.ietf.org/html/rfc3376).

With regard to the MLD protocol, the latest version of the MLD protocol is MLDv2, which is described in the RFC 3810 specifications published on line by the IETF (R. Vida et al., Engineering Task Force, Network Working Group, Request for Comments 3810, June 2004; currently available at Internet address http://tools.ietf.org/html/rfc3810).

The PIM-SM protocol used for the communication between routers is described in the RFC 4601 specifications published on line by the IETF (B. Fenner et al., Engineering Task Force, Network Working Group, Request for Comments 4601, August 2006; currently available at Internet address http://tools.ietf.org/html/rfc4601).

Multicast technology was initially implemented primarily to be applied to the many-to-many communication model, known as ASM (Any Source Multicast), in which many users communicate with one another and any of them can send data and also receive data from everyone else. A typical ASM application is multiparty calling via Internet.

Multicast technology was then implemented to be applied to the one-to-many communication model known as SSM (Source Specific Multicast), in which a single source sends data for many recipients.

In accordance with the common nomenclature in SSM technology, the transmission from the source S of the multicast group G is called channel (S,G), where S is an IP address that identifies the source that transmits the data and G is an IP address, within the range reserved for multicast groups, which identifies the multicast group.

The terms "upstream" and "downstream" are used in the following to indicate relative locations from a network device: the term "upstream" refers to a location toward the multicast source and the term "downstream" refers to a location in the opposite direction.

A problem in managing multicast traffic in the switches of the state of the art is that when an Ethernet switch connecting routers, or routers and hosts, receives an IP data packet with a multicast group IP address, the switch cannot associate the multicast group IP address with the unicast MAC addresses of the equipment connected to its ports, and therefore the switch does not know through which ports and to which equipment it should send the data packet. When the switch receives an IP data packet with a multicast group address, since it cannot know through which ports and to which equipment it should send the packet, it sends it through all its ports and to all the equipment connected to the ports. This operation involves unnecessary bandwidth consumption, given that the switch is sending data packets to equipment that does not need the packets. Furthermore, in some cases this equipment receiving unrequested packets must process them in order to decide what to do with them, which unnecessarily reduces the processing capacity of the equipment for other tasks.

To avoid this problem, a series of techniques to be used in Ethernet switches which transmit multicast traffic between routers or between routers and hosts have been developed. A technique referred to as IGMP snooping has been imposed in the section of the network where IGMP messages circulate, this technique is described below and it does allow the switch to manage SSM multicast traffic and to take into account the IP addresses of the sources of origin of the data.

The RFC 4541 specifications, edited online by the IETF (M. Christensen et al., Engineering Task Force, Network Working Group, Request for Comments 4541, May 2006; currently available at Internet address http://tools.ietf.org/html/rfc4541) describe the operation of a switch performing a function referred to as IGMP snooping so as to prevent sending all the multicast data packets through all its ports and to all the equipment connected to the ports. This IGMP snooping function consists of the switch analyzing the IP data packets containing IGMP messages and creates a table with the information of the multicast channels or groups that the switch must send through each of its ports. The switch thus sends through each of its ports only the multicast channels that the hosts connected to the port have requested. The reason that the switch must perform this snooping function is that a switch is usually a layer 2 equipment in the OSI model and therefore neither knows nor uses layer 3 protocols such as the IP protocol.

As previously explained, multicast technology is widely used currently to transmit television by Internet (IPTV).

The difference between a broadcast transmission and a multicast transmission is that a broadcast transmission is directed to all receivers or hosts, while a multicast transmission arrives only at the host group that has sent an IGMP message to receive the transmission.

In systems that use broadcast technologies, such as, for example, Digital Video Broadcasting Terrestrial (DVG-T) and Digital Video Broadcasting for Handheld Mobile Television (DVB-H), it is possible for the same television channel that transmits the same first content in different geographic areas to insert a second type of content that is different in different geographic areas. This makes it possible, for example, to insert regional information or content or to insert different advertising for some geographic areas.

In broadcast technology, one way of inserting different content in the same television channel in different geographic areas consists of carrying each signal separately to the television transmission antenna of each geographic area. In this way, the content each antenna receives for transmission is already customised, for example with regional content or localised advertising. However, this system entails an enormous allocation of bandwidth since each area must receive its own data stream. In large areas with thousands of transmission antennas, this entails considerable cost.

In current multicast technology there is no system which allows content that depends on a geographic area to be inserted in an optimised manner.

SUMMARY

According to one implementation a method is provided comprising: receiving in a first network interface of a router a first request for a first type of multicast traffic in a first multicast routing protocol, storing in the router for the first network interface and the first type of multicast traffic a second type of multicast traffic, transmitting from the router using a second multicast routing protocol requests for the first and second types of multicast traffic, receiving in the router the first and second types of multicast traffic comprising first and second IP packets, respectively, modifying in the router one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets via the first network interface.

According to one implementation a method is provided comprising a router that receives by a first network interface of the router a first message in a first multicast routing protocol with a first request for a first type of multicast traffic and receives by a second network interface (232) of the router a second message in the first multicast routing protocol with a second request for the first type of multicast traffic and determines at least the second type of multicast traffic and the third type of multicast traffic from the first type of multicast traffic and from information stored in the router about a second type of multicast traffic associated with the first type of multicast traffic and the first network interface and about a third type of multicast traffic associated with the first type of multicast traffic and the second network interface and sends messages in a second multicast routing protocol to request at least the first, second and third type of multicast traffic and receives multicast IP packets corresponding to the first, second and third type of multicast traffic and transmits unmodified the IP packets of the first type of multicast traffic and by the first and second network interface modifies at least one field of the header of the multicast IP packets of the second type of multicast traffic so that they have the same source IP address and the same multicast destination IP address as the headers of the IP packets of the first type of multicast traffic and transmits the modified IP packets by the first network interface and modifies at least one field of the header of the multicast IP packets of the third type of multicast traffic so that they have the same source IP address and the same multicast destination IP address as the headers of the IP packets of the first type of multicast traffic and transmits the modified IP packets by the second network interface.

According to one implementation a method is provided comprising: receiving in a first network interface of a router a first request for a first type of multicast traffic in a first multicast routing protocol, receiving in a second network interface of the router a second request for the first type of multicast traffic in the first multicast routing protocol, storing in the router for the first network interface and the first type of multicast traffic a second type of multicast traffic, storing in the router for the second network interface and the first type of multicast traffic a third type of multicast traffic, transmitting from the router using a second multicast routing protocol requests for the first, second and third types of multicast traffic, receiving in the router the first, second and third types of multicast traffic, the received first, second and third types of multicast traffic comprising first, second and third IP packets, respectively, modifying in the router one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets via the first network interface, and modifying in the router one or both of the IP source address and the IP multicast destination address of some or all of the third IP packets so that the IP source address and the IP multicast destination address of some or all of the third IP packets are the same as the first IP packets of the first type of multicast traffic, transmitting the first IP packets and the modified third IP packets via the second network interface.

In one implementation a method is provided comprising: receiving in a router a first request for a first type of multicast traffic in a first multicast routing protocol, the first requested corresponding to a first plurality of hosts, receiving in the router a second request for the first type of multicast traffic in the first multicast routing protocol, the second request corresponding to a second plurality of hosts, associating in the router the first type of multicast traffic with a second type of multicast traffic based on information in the first request, associating in the router the first type of multicast traffic with a third type of multicast traffic based on information in the second request, transmitting from the router using a second multicast routing protocol requests for the first, second and third types of multicast traffic, receiving in the router the first, second and third types of multicast traffic, the received first, second and third types of multicast traffic comprising first, second and third IP packets, respectively, modifying in the router one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets toward the first plurality of hosts, and modifying in the router one or both of the IP source address and the IP multicast destination address of some or all of the third IP packets so that the IP source address and the IP multicast destination address of some or all of the third IP packets are the same as the first IP packets of the first type of multicast traffic, transmitting the first IP packets and the modified third IP packets toward the second plurality of hosts.

According to one implementation a method is provided comprising: an application generating in a host a first request for a first type of multicast traffic, associating in the host the first type of multicast traffic with a second type of multicast traffic, generating in the host a second request for the second type of multicast traffic, transmitting from the host the first and second requests, receiving in the host the first and second types of multicast traffic comprising first and second IP packets, respectively; and modifying in the host one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets to the application requesting the first type of multicast traffic.

According to one implementation a method is provided comprising: an application generating in a host a first request for a first type of multicast traffic, transmitting from the host the first request, receiving in the host the first type of multicast traffic comprising first IP packets, associating in the host the first type of multicast traffic with a second type of multicast traffic based on information in at least one of the first IP packets, generating in the host a second request for the second type of multicast traffic, transmitting from the host second request, receiving in the host the second type of multicast traffic comprising second IP packets; and modifying in the host one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets to the application requesting the first type of multicast traffic.

In one implementation, the first multicast routing protocol is a version of the IGMP (Internet Group Management Protocol) or MLD (Multicast Listener Discovery) Protocol.

In one implementation, the second multicast routing protocol is a version of the PIM (Protocol Independent Multicast) protocol.

In one implementation, the first type of multicast traffic is a multicast channel (S1,G1)

In one implementation, the first type of multicast traffic is a multicast group G1.

In one implementation, the IP packets of the second type of multicast traffic (S1,G2) and of the third type of multicast traffic (S1,G3) have the same source IP address S1 as the first type of multicast traffic and different multicast destination IP addresses than the first type of multicast traffic.

In one implementation, the IP packets of the second type of multicast traffic (S2,G1) and of the third type of multicast traffic (S3,G1) have the same multicast destination IP address G1 as the first type of multicast traffic and different multicast source IP addresses than the first type of multicast traffic.

In one implementation, the IP packets of the second type of multicast traffic (S2,G2) and of the third type of multicast traffic (S3,G3) have different source and destination IP addresses than the first type of multicast traffic.

In one implementation the second multicast routing protocol is a version of the IGMP (Internet Group Management Protocol) or MLD (Multicast Listener Discovery) Protocol.

In one implementation, the information stored in the router that associates the first type of multicast traffic with other types of multicast traffic is configured by means of the SNMP (Simple Network Management Protocol) protocol.

BRIEF DESCRIPTION OF THE DRAWINGS

Other advantages and characteristics of the present developments will become apparent from the following description concerning but not limited to some implementations with reference to the accompanying drawings.

DETAILED DESCRIPTION

Figure 1:
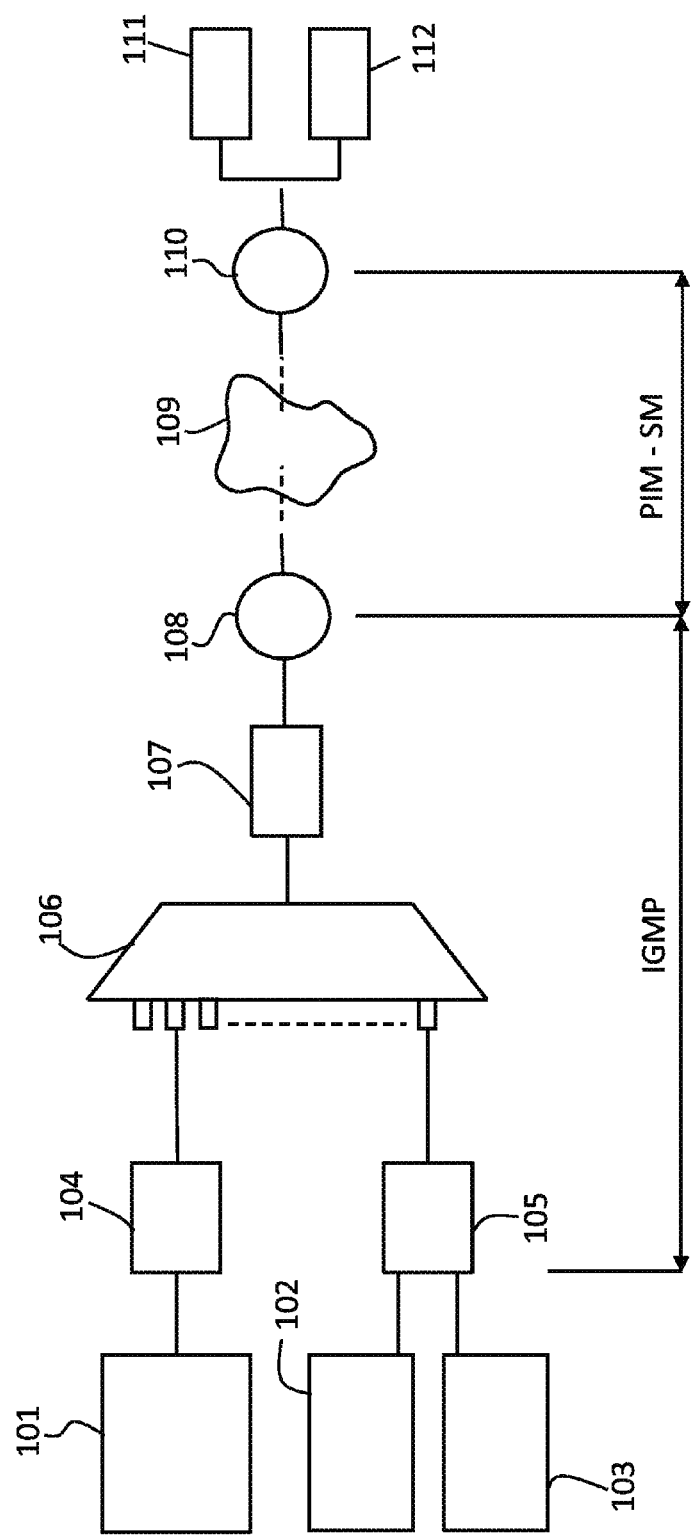
FIG. 1 illustrates a basic example of an implementation of a multicast system in a data network.

FIG. 1 illustrates a basic example of a multicast system in a data network. In this example, three hosts 101, 102, 103 are connected to the data network through CPEs 104, 105 (CPE: Customer-Premises Equipment). A CPE is a terminal for connecting to the network that is located on the subscriber access line side, which communicates for example by means of a DSL (Digital Subscriber Line) modem. The host 101 is connected to a CPE 104 of a subscriber line, whereas both hosts 102 and 103 are connected to another CPE 105 of another subscriber line. CPEs 104, 105 are connected to a DSLAM 106 (DSLAM: Digital Subscriber Line Access Multiplexer) which directs traffic from the different CPEs 104, 105 through a switch 107 to a router 108 which is in turn connected to an IP (Internet Protocol) network 109. Another router 110 is connected at another point of the IP network 109, which router receives the data packets sent by several sources 111, 112 of a multicast group.

FIG. 1 shows a group formed by several hosts 101, 102, 103 connected to a router 107, and a group of sources 111, 112 connected to a router 110. Multicast systems may be made up of a large number of these assemblies and groups.

FIG. 1 also shows the an application of each of the IGMP and PIM-SM protocols where the IGMP protocol is applied to communications between the receiving hosts and the routers, through the CPEs and the DSLAMs, whereas the PIM-SM protocol is applied to communications between different routers through the IP network.

It has been assumed in this example that the routers operate with the IPv4 version of the IP protocol and therefore the system uses the IGMP protocol. However, the reasons set forth are also applied to a system using the MLD protocol (version IPv6 of the IP protocol). It is to be appreciated, however, other protocols are also applicable.

The CPEs and the DSLAMs are equipment that can carry out an IGMP proxy function consisting of receiving several IGMP requests and assembling them to reduce the volume of IGMP messages which are sent to the router. This operation is described in the RFC 4605 specifications of the IETF mentioned at the beginning.

A basic operation of the multicast system shown in FIG. 1 can be described as follows. The hosts 101, 102, 103 send to the CPEs 104, 105 several IGMP messages in which they identify the multicast address of the group and the source addresses from which they wish to receive data. The CPEs receiving several IGMP messages from different hosts, as is the case of the CPE 105 in the example of FIG. 1, assemble these IGMP messages to send to the DSLAM a single IGMP message for each multicast group address. For its part, the DSLAM 106 receives IGMP messages from different CPEs, in this case CPEs 104, 105, and assembles them to send to the router 108, through switch 107, an IGMP message in which INCLUDE or EXCLUDE sources are indicated for each multicast group.

The router 108 receives the IGMP message sent by DSLAM 106 through switch 107, and communicates with other IP network routers using the PIM-SM protocol for setting up routing through the IP network making the data sent by the sources specified in the IGMP message to reach the router 108.

Although the explanation of the different exemplary implementations disclosed herein makes reference to the IGMP protocol, other protocols are also applicable.

Figure 2:
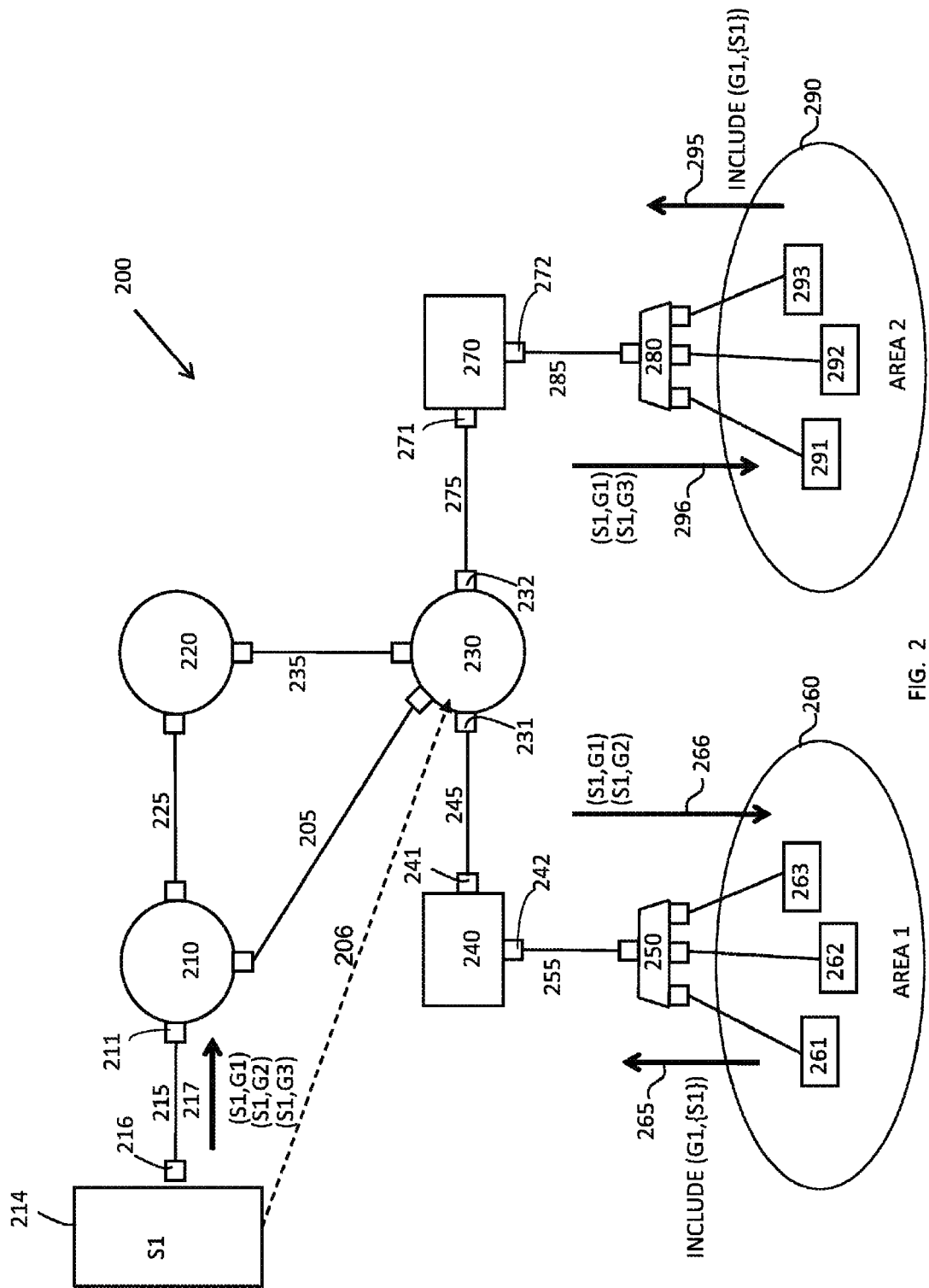
FIG. 2 illustrates another basic example of an implementation of a multicast system in a data network.

FIG. 2 shows an implementation that allows the hosts of different geographic areas to receive IP packets with a customised content in each geographic area when they request the same multicast traffic, for example the traffic from a multicast channel (S1,G1) transmitted by a server 214 through a data network formed by various routers, switches and proxies.

FIG. 2 shows a network 200 that includes two areas indicated as AREA1 260 and AREA2 290. In one implementation, the hosts 261, 262 and 263 of AREA1 and the hosts 291, 292 and 293 of AREA2 may request the same multicast traffic, for example the traffic from a specific multicast channel (S1,G1), and the multicast traffic that the hosts receive from both areas contain a first part formed by multicast IP packets that are the same for both areas, and a second part formed by multicast IP packets that are different for each of the areas AREA1 and AREA2.

For this purpose, in one implementation the server 214 transmits different types of multicast traffic by its network interface 216 connected by means of a data network 215 with the network interface 211 of a PIM-SM router 210. The different types of multicast traffic that the server 214 transmits are represented by the arrow 217, which represents the transmission of IP packets from the multicast channels (S1, G1), (S1,G2) and (S1,G3).

In one implementation a first type of multicast traffic is formed by IP packets from the multicast channel (S1,G1) that are addressed to both areas AREA1 and AREA2. In one implementation a second type of multicast traffic is formed by IP packets from the multicast channel (S1,G2) that are addressed to the hosts of the AREA1. In one implementation a third type of multicast traffic is formed by IP packets from the multicast channel (S1,G3) that are addressed to the hosts of the AREA2.

For the sake of simplicity, FIG. 2 shows only two areas. However, it is to be appreciated that the implementations disclosed and contemplated herein are applicable to greater than two areas, and may be applied to many areas.

In one implementation router 230 is a router that uses the PIM-SM protocol to communicate with other PIM-SM routers 220 and 210, and it uses the IGMP protocol to communicate with the IGMP Proxies 250 and 280 through the switches 240 and 270, respectively.

In one implementation router 230 is connected by means of network 245 to the port 241 of switch 240. IGMP proxy 250 is also connected to switch 240 by means of network 255 to the port 242 of the SWITCH 240.

In one implementation router 230 is connected by means of network 275 to the port 271 of switch 270. In one implementation IGMP proxy 280 is also connected to the switch 270 by means of network 285 connected to the port 272.

In one implementation the hosts of the areas AREA1 and AREA2 send messages to the router 230, for example using the IGMPv3 protocol, to request the multicast traffic from the multicast channel (S1,G1). The messages are represented in FIG. 2 by the elements 265 and 295.

In one implementation router 230 uses, for example, the IGMP and PIM-SM protocol and receives by its network interface 231, in one implementation, at least one IGMPv3 message originating from a host of the AREA1 requesting the traffic from the multicast channel (S1,G1). In one implementation router 230 also receives by its network interface 232 at least one IGMPv3 message originating from a host of the AREA2 requesting the traffic from the multicast channel (S1,G1).

In one implementation router 230 stores information, for example in a table, in which it associates with a multicast group or channel and with a geographic area a second type of multicast traffic that includes content intended for each geographic area. For example, the router 230 can have the following Table 1 stored in memory:

TABLE 1

Local multicast channels associated in each area with a multicast channel (S1, G1) which, for example, is an IPTV channel.

| CHANNEL | AREA1 | AREA2 |
| --- | --- | --- |
| (S1, G1) | (S1, G2) | (S1, G3) |

In one implementation router 230 stores information in which it associates with each multicast group or channel and with each geographic area a second type of multicast traffic that includes content intended for each geographic area.

Thus, in one implementation router 230 receives a message from a host of AREA1 requesting the traffic from the multicast channel (S1,G1), the router 230 knows that the traffic from the multicast channel (S1,G1) has a localized multicast traffic associated in the AREA1, for example, multicast channel (S1,G2).

In one implementation, when router 230 receives a message from a host from AREA2 requesting the traffic from the multicast channel (S1,G1), the router 230 knows that the traffic from the multicast channel (S1,G1) has a localized multicast traffic associated to the AREA2, for example, multicast channel (S1,G3).

In one implementation, when router 230 transmits a message to receive traffic from the multicast channel (S1,G1), for example using the PIM-SM protocol, the router 230 also transmits messages to request the localized traffic that corresponds to the areas AREA1 and AREA2. For example, if the router 230 sends a Join(S,G) type PIM-SM message to receive the traffic from the multicast channel (S1,G1), then the router 230 also sends Join(S,G) type messages to receive the traffic from the multicast channels (S1,G2) and (S1,G3).

In one implementation the traffic from the multicast channels (S1,G1), (S1,G2) and (S1,G3) transmitted by server 214 arrives at the router 230 directly by means of network 205 or indirectly by passing through the PIM-SM router 220 using networks 225 and 235.

In one implementation router 230 receives traffic from the three multicast channels (S1,G1), (S1,G2) and (S1,G3) and transmits by its network interfaces 231 and 232 connected to the switched 240 and 270, respectively, the IP packets that correspond to each geographic area so that the packets arrive at the areas AREA1 and AREA2.

In one implementation router 230 transmits by network 245 to switch 240 the IP packets from the multicast channels (S1,G1) and (S1,G2) so that the IP packets arrive at the hosts of the AREA1 through the switch 240 and the IGMP Proxy 250. This transmission of the multicast channels (S1,G1) and (S1,G2) is indicated by the arrow 266.

In one implementation router 230 transmits by network 275 to switch 270 the IP packets from the multicast channels (S1,G1) and (S1,G3) so that the IP packets arrive at the hosts of AREA2 through the switch 270 and the IGMP proxy 280. This transmission from the multicast channels (S1,G1) and (S1,G3) is indicated by the arrow 296.

In one implementation, when router 230 receives a message requesting the traffic from the multicast channel (S1, G1), the router 230 associates the request with a geographic area.

The router 230 may determine the geographic area of hosts that send the messages requesting multicast traffic in a number of ways. In one implementation the router determines the geographic area of the host or group of hosts that send the requests taking into account the network interface of the router by which the message/requests arrived. For example, in one implementation the request from the hosts of the AREA1 will arrive at the router 230 through the network interface 231 of the router, while the messages/requests from the hosts of AREA2 will arrive at the router 230 through the network interface 232. Thus, the router 230 determines the geographic area from the network interface by which it receives the multicast traffic requests. In one implementation router 230 may store information, for example in the form of a table, listing the geographic areas with the network interfaces, stored in its memory. Table 2 illustrates an example.

TABLE 2

| Interface | Area |
| --- | --- |
| 231 | AREA1 |
| 232 | AREA2 |

In one implementation the router may directly store the localized traffic that is associated with each geographic area using the network interface as shown in Table 3:

TABLE 3

| CHANNEL | Interface 231 | Interface 232 |
| --- | --- | --- |
| (S1, G1) | (S1, G2) | (S1, G3) |

In one implementation, when router 230 receives a message to transmit the multicast channel (S1,G1) through its network interface 231, the router requests and transmits the traffic from the multicast channels (S1,G1) and (S1,G2). In the same way, when the router 230 receives a message to transmit the multicast channel (S1,G1) through its network interface 232, the router requests and transmits the traffic from the multicast channels (S1,G1) and (S1,G3).

In one implementation, router 230 may determine the area to which a host pertains by determining the source IP address of the IP packet that transmits the message that requests the multicast traffic such as, for example, an IP packet that carries a message in the IGMPv3 protocol. In one implementation router 230 may have stored in its memory a table in which each IP address is associated with specific localized multicast traffic and, in this way, can associate localized multicast traffic for a host or per group of hosts from the IP addresses of the hosts.

Figure 3:
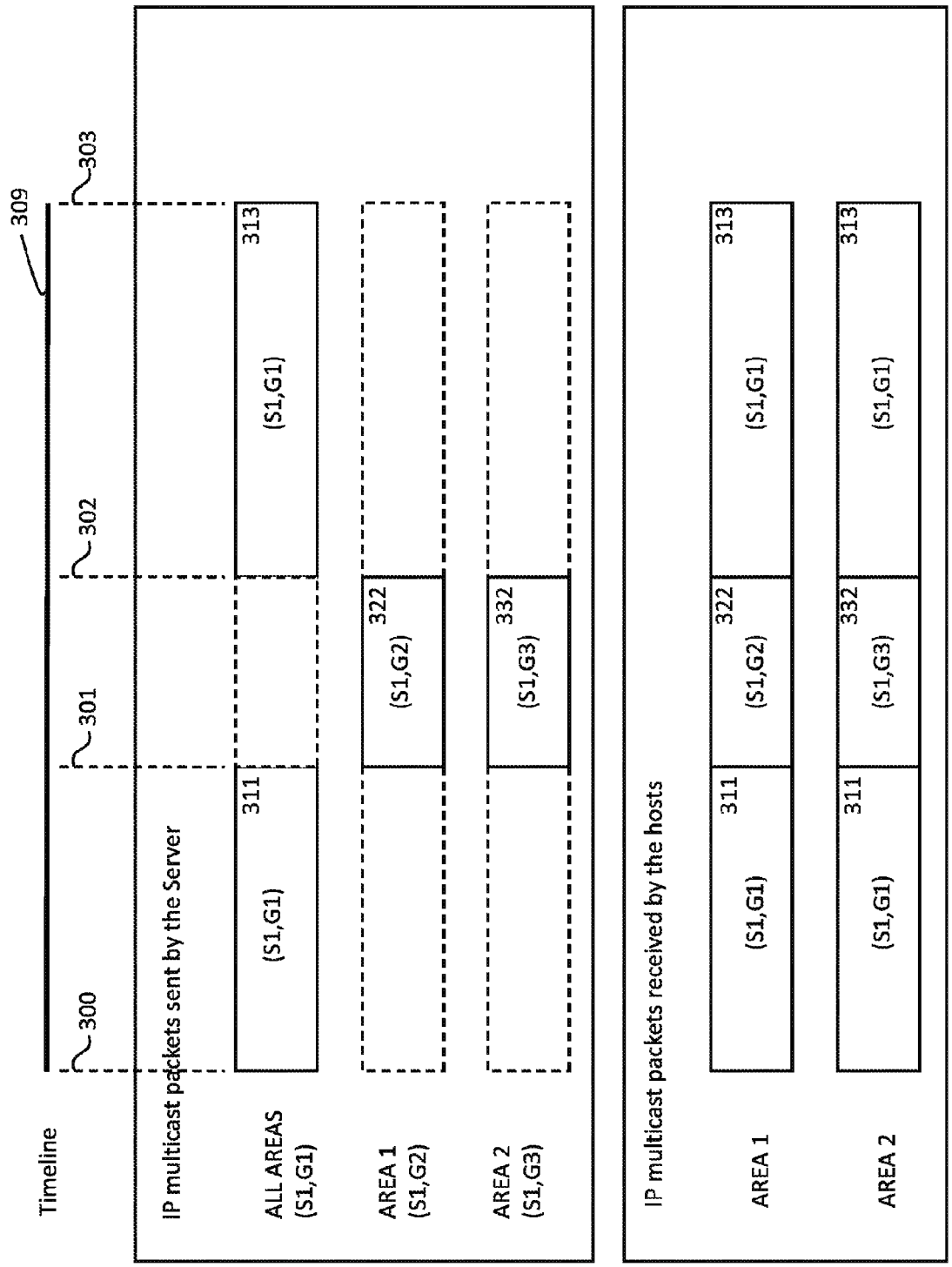
FIG. 3 illustrates an implementation that uses different multicast channels that have the same source IP address and different multicast destination IP addresses.

FIG. 3 illustrates an example of how server 214 may transmit by its network interface 216 the multicast traffic from the different multicast channels (S1,G1), (S1,G2) and (S1,G3), and how the router 230 may transmit the multicast traffic to the hosts of the areas AREA1 and AREA2. Line 309 indicates time. In one implementation the transmission is initiated at the moment indicated by the element 300 and ends at the moment indicated by the element 303.

In one implementation the server 214 transmits the three multicast channels (S1,G1), (S1,G2) and (S1,G3) in the manner indicated in FIG. 3. Between the moment 300 and the moment 301, the server 214 transmits the IP packets 311 using the multicast channel (S1,G1). Between the instant 301 and the moment 302, the server 214 transmits the IP packets 322 and 332 using the multicast channels (S1,G2) and (S1, G3), respectively. Between the moment 302 and the moment 303, the server 214 transmits the multicast traffic of the IP packets 313 using the multicast channel (S1,G1).

In one implementation router 230 transmits by its network interface 231 the IP packets from the multicast channels (S1,G1) and (S1,G2) and by its network interface 232 the IP packets from the multicast channels (S1,G1) and (S1,G3).

Thus, in one implementation the hosts of AREA1 receive the IP packets 311, 322 and 313 that correspond to the multicast channels (S1,G1), (S1,G2) and (S1,G1), respectively. The hosts of AREA2 receive the IP packets 311, 332 and 313 that correspond to the multicast channels (S1,G1), (S1,G3) and (S1,G1), respectively.

In this way, each area AREA1 and AREA2 receives a common content formed by the packets from the multicast channel (S1,G1) and a localised content formed by the packets from the multicast channel (S1,G2) for the AREA1 and the packets from the multicast channel (S1,G3) for the AREA2.

In the example of FIG. 3, the server 214 uses the multicast channel (S1,G1) to transmit the multicast traffic that is going to be sent to both areas AREA1 and AREA2 and uses the channels (S1,G2) and (S1,G3) to transmit the multicast traffic that is going to be sent to only one of the areas AREA1 and AREA2, respectively.

In the example of FIG. 3, the server uses the same source IP address S1 for all multicast IP packets that it transmits and it distinguishes the different types of multicast traffic using the different multicast destination addresses or multicast groups G1, G2 and G3.

Nevertheless, other configurations are possible in order for the server 214 to transmit different types of multicast traffic. The following Table 4 shows other examples:

TABLE 4

|   | CHANNEL  | AREA1    | AREA2    |
|---|----------|----------|----------|
| 1.| (S1, G1) | (S1, G2) | (S1, G3) |
| 2.| (S1, G1) | (S2, G1) | (S3, G1) |
| 3.| (S1, G1) | (S2, G2) | (S3, G3) |
| 4.| G1       | G2       | G3       |

The first example has been explained by use of FIG. 3, which uses different destination IP addresses or addresses of multicast groups G1, G2 and G3 for each type of multicast traffic transmitted by the server.

According to the second example, example 2, server 214 uses the same multicast group G1 but distinguishes the type of traffic using the different source IP addresses S1, S2 and S3 in the multicast IP packets that it transmits. For this purpose, in one implementation the server 214 needs to use three source IP addresses; for example, using three network interfaces (not shown in FIG. 2) each of which has a different IPv4-type address assigned or using only one network interface that has three different IPv6-type addresses assigned. It is also possible to transmit the traffic using multiple servers, each of which has a network interface with one or more IP addresses assigned.

According to a third example, example 3, server 214 uses a different source IP address and a different multicast destination IP address or multicast group: (S1,G1), (S2,G2) and (S3,G3) for each type of multicast traffic.

According to a fourth example, example 4, three types of multicast traffic are distinguished by using different multicast groups G1, G2 and G3.

Figure 4:
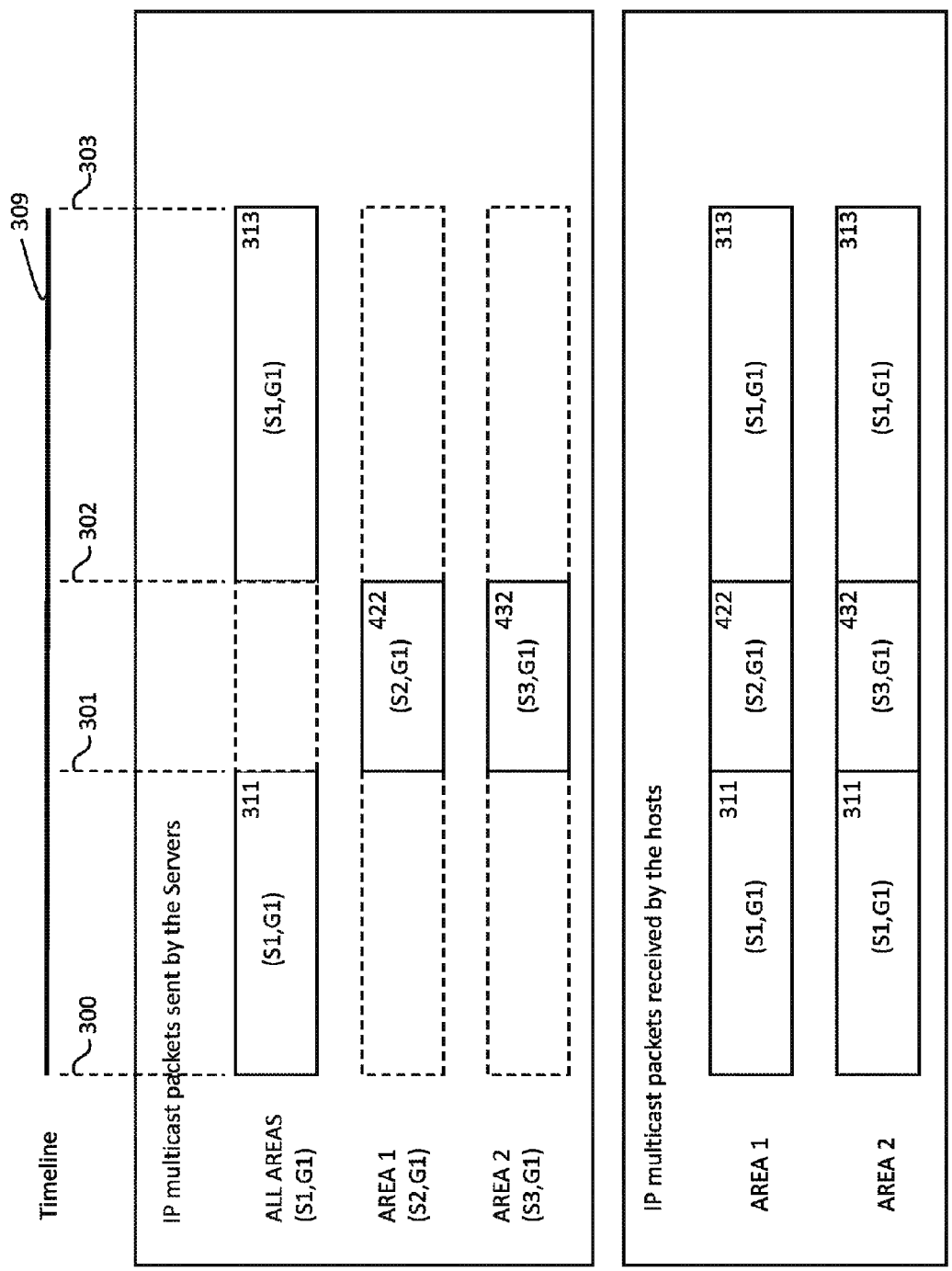
FIG. 4 illustrates an implementation that uses different multicast channels that have different source IP addresses and the same multicast destination IP address.
Figure 5:
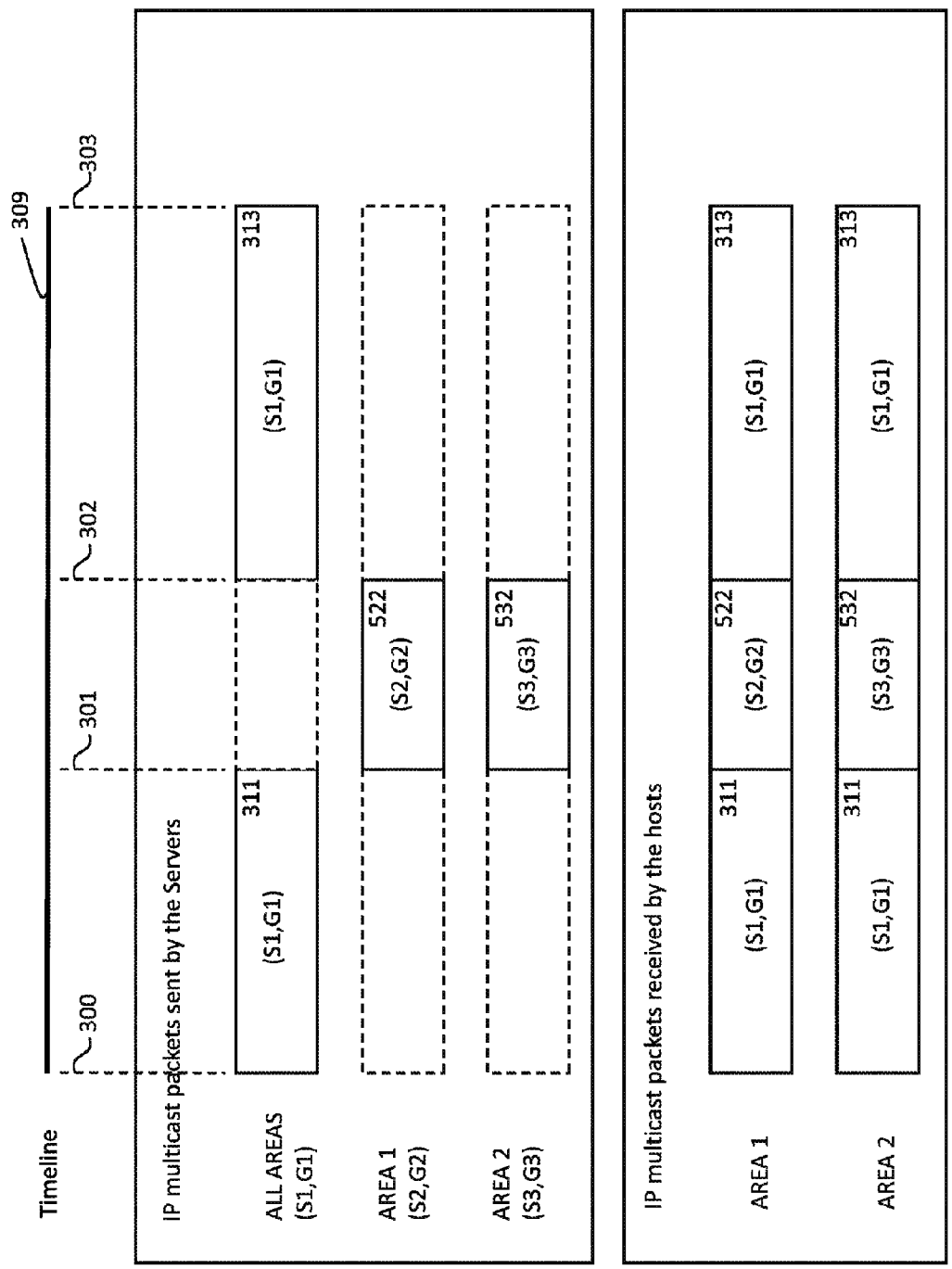
FIG. 5 illustrates an implementation that uses different multicast channels that have different source and destination IP addresses.
Figure 6:
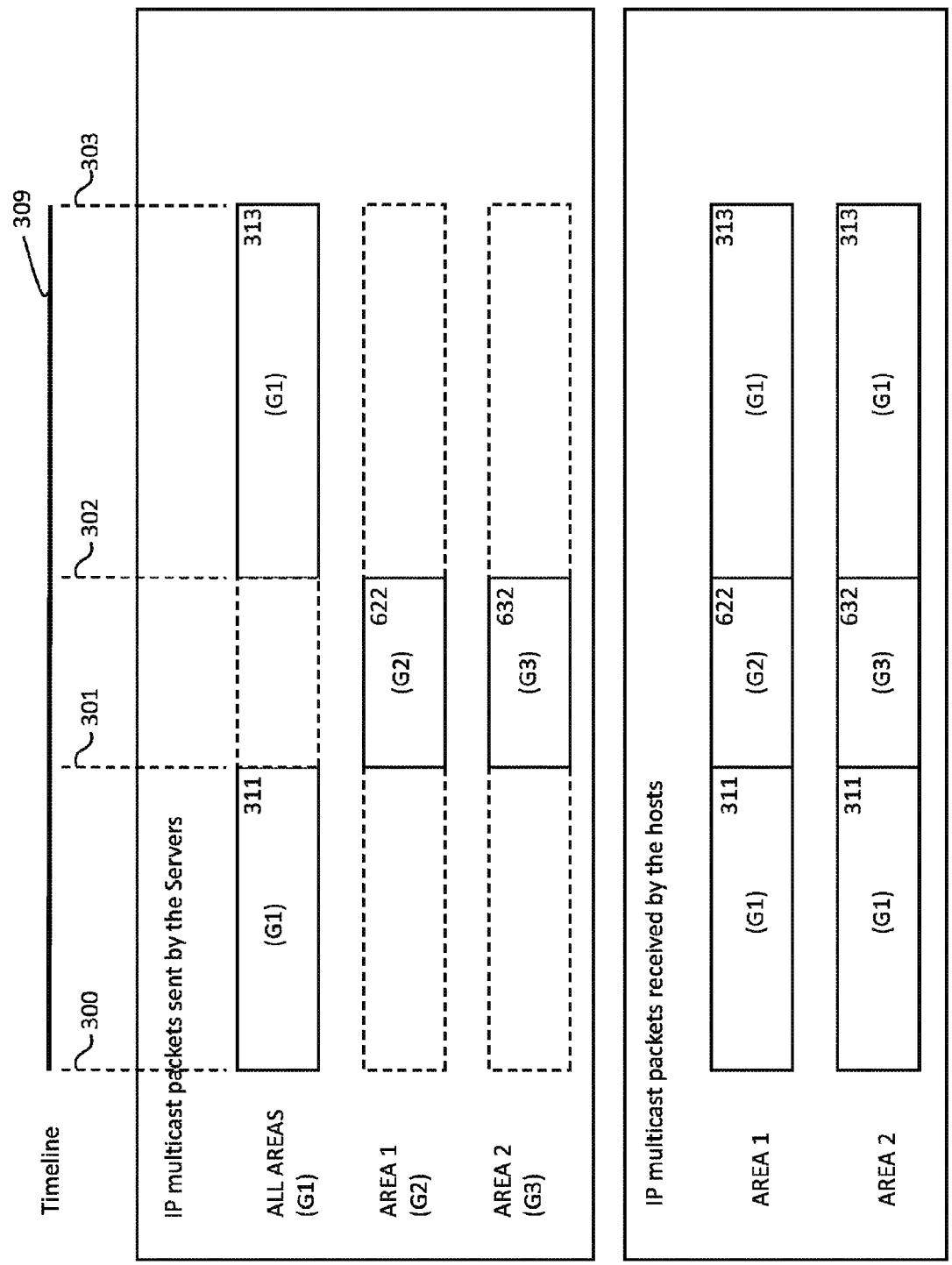
FIG. 6 illustrates an implementation that uses multicast groups.

Exemplary implementations of examples 2, 3 and 4 are shown in FIGS. 4, 5 and 6, respectively.

In FIG. 4, according to one implementation, server 214 transmits the three multicast channels (S1,G1), (S2,G1) and (S3,G1) using the same multicast group G1. In one implementation, between the moment 300 and the moment 301, the server 214 transmits the IP packets 311 using the multicast channel (S1,G1). In one implementation between the moment 301 and the moment 302, server 214 transmits the IP packets 422 and 432 using the multicast channels (S2,G1) and (S3, G1), respectively. In one implementation between the moment 302 and the moment 303, server 214 transmits the multicast traffic from the IP packets 313 using the multicast channel (S1,G1).

In one implementation router 230 transmits, by its network interface 231, the IP packets from the multicast channels (S1,G1) and (S2,G1) and, by its network interface 232, the IP packets from the multicast channels (S1,G1) and (S3,G1). Thus, the hosts of the AREA1 receive the IP packets 311, 422 and 313 that correspond to the multicast channels (S1,G1), (S2,G1) and (S1,G1), respectively. The hosts of the AREA2 receive the IP packets 311, 432 and 313, which correspond to the multicast channels (S1,G1), (S3,G1) and (S1,G1), respectively.

It is important to note that with respect to the time line of FIG. 4 and the examples that follow, that the implementations disclosed herein are not limited by the moments or time intervals by which the IP packets are transmitted. For example, the implementation of FIG. 4 may be modified so that all or a portion of IP packets 422 are transmitted prior to the transmission of all or a portion of packets 311 and 312. Another modification may include first transmitting all of IP packets 311 and 313 prior to transmitting packets 422.

In FIG. 5, according to one implementation, server 214 transmits the three multicast channels (S1,G1), (S2,G2) and (S3,G3) using different source IP addresses and different multicast destination IP addresses. In one implementation between the moment 300 and the moment 301, server 214 transmits the IP packets 311 using the multicast channel (S1,G1). In one implementation between the moment 301 and the moment 302, server 214 transmits the IP packets 522 and 532 using the multicast channels (S2,G2) and (S3,G3), respectively. In one implementation between the moment 302 and the moment 303, server 214 transmits the multicast traffic from the IP packets 313 using the multicast channel (S1,G1).

In one implementation router 230 transmits, by its network interface 231, the IP packets from the multicast channels (S1,G1) and (S2,G2) and, by its network interface 232, the IP packets from the multicast channels (S1,G1) and (S3,G3). Thus, the hosts of the AREA1 receive the IP packets 311, 522 and 313 that correspond to the multicast channels (S1,G1), (S2,G2) and (S1,G1) respectively. The hosts of the AREA2 receive the IP packets 311, 532 and 313, which correspond to the multicast channels (S1,G1), (S3,G3) and (S1,G1), respectively.

In FIG. 6, according to one implementation server 214 transmits the three types of multicast traffic G1, G2 and G3 using different destination multicast IP addresses. In one implementation between the moment 300 and the moment 301, the server 214 transmits the IP packets 311 using the multicast group G1. In one implementation between the moment 301 and the moment 302, the server 214 transmits the IP packets 622 and 632 using the multicast groups G2 and G3 respectively. In one implementation between the moment 302 and the moment 303, the server 214 transmits the multicast traffic from the IP packets 313 using the multicast group G1.

In one implementation router 230 transmits, by its network interface 231, the IP packets from the multicast groups G1 and G2 and, by its network interface 232, the IP packets from the multicast groups G1 and G3. Thus, the hosts of the AREA1 receive the IP packets 311, 622 and 313, which correspond to the multicast groups G1, G2 and G1, respectively. The hosts of the AREA2 receive the IP packets 311, 632 and 313, which correspond to the multicast groups G1, G3 and G1, respectively.

According to the examples of FIGS. 3, 4, 5 and 6 some technical problems may arise in the switches, the IGMP proxies and the hosts. These problems are explained by the example of FIG. 3, which uses the multicast channels (S1, G1), (S1,G2) and (S1,G3).

If the switches 240 and 270 are switches that perform the function called IGMP snooping to transmit by each port of the switch only the multicast traffic requested by the hosts at each port, then the ports 242 and 272 of the switches 240 and 270, respectively, will only transmit the traffic from the multicast channel (S1,G1) that has been requested by an IGMPv3 message and will not transmit the traffic from the other multicast channels (S1,G2) and (S1,G3) as the ports of the switch have not received IGMP messages indicating that they should transmit the multicast channels.

A similar problem occurs in the IGMP Proxies 250 and 280. The proxies transmit to the hosts by their downstream interfaces only the multicast traffic requested by the hosts—in the example of FIG. 3, the multicast channel (S1,G1)—and they do not transmit to the hosts the other multicast channels (S1,G2) and (S1,G3) that were not requested by the hosts.

There is also a problem in the hosts as the operating system of the hosts filters the multicast IP packets received by the hosts by their network interface but which have not been requested by any application or process of the host. The RFC 3376 describe a way that can be used by the hosts to select the multicast traffic they wish to receive. The following is a brief summary of the operation thereof:

Paragraph 2. "The Service Interface for Requesting IP Multicast Reception" of the RFC 3376 specifications describes a service interface that can be used by the upper network layers of the host protocols or the host programs in order to request that the IP network layer accept or reject the multicast traffic from certain multicast addresses. For this purpose, it uses a function known as IPMulticastListen.

The RFC 3376 specifications of the IGMPv3 explain that the systems must support IGMP messages as per the following function, which enables a host to choose the multicast data sources:

IPMulticastListen (socket, interface, multicast-address, filter-mode, {source-list})

where:

"socket" is a parameter used to distinguish the different applications that are executed on the system (for example, programs and processes) and which call to the IPMulticastListen function.

"interface" is a local identifier for the network card or network interface on which one wishes to receive the multicast traffic indicated in the call to the IPMulticastListen function. If is wished to receive the same multicast traffic on more than one network interface, the IPMulticastListen function is called separately for each network interface.

"multicast-address" is the multicast group address.

"filter-mode" is the network interface mode, which may be INCLUDE or EXCLUDE. In the INCLUDE mode, the network interface defines the source-list as INCLUDE; this means that it wishes to receive the multicast group traffic sent by all the sources in the list. In the EXCLUDE mode, the network interface defines the source-list as EXCLUDE; this means that it wishes to receive the multicast group traffic from all the sources sent in the multicast group, except the sources in the list.

"source-list" is the INCLUDE or EXCLUDE source-list.

For a given socket combination, network interface, and multicast group, there can only be one "filter mode", which may be INCLUDE or EXCLUDE.

The system stores a status register for each active socket. This register contains the following information:

(interface, multicast-address, filter-mode, {source-list})

For each socket, the "filter-mode" of the register can only be INCLUDE or EXCLUDE.

Likewise, the system stores a status register for each network interface and multicast group. This register contains the following information:

(multicast-address, filter-mode, {source-list})

Each network interface and multicast group has a state record storing the information on the interface and group and the state record contains a field referred to as filter-mode which can only be of the INCLUDE type, containing only INCLUDE sources, or of the EXCLUDE type, containing only EXCLUDE sources. The rules that are transcribed below are applied when the network interface record must result from the combination of different records:

Rule 1. If any of the data sources of a group G1 is EXCLUDE, then the network interface will have an EXCLUDE filter-mode for the group G1 and the source list of the network interface is the intersection of the EXCLUDE source lists minus the sources of the INCLUDE lists.

Rule 2. If all the sources are INCLUDE type sources, then the network interface will have an INCLUDE filter-mode for the group G1 and the source list is the union of all the INCLUDE sources.

Consequently, although the IP packets of the multicast channels (S1,G2) and (S1,G3) of the example of FIG. 3 arrive at the hosts, the operating system of the hosts would filter out the IP packets because they have not been requested by any application or process of the hosts.

Similar problems may occur in the switches, the IGMP proxies and the hosts in the examples of FIGS. 4, 5 and 6.

Figure 7:
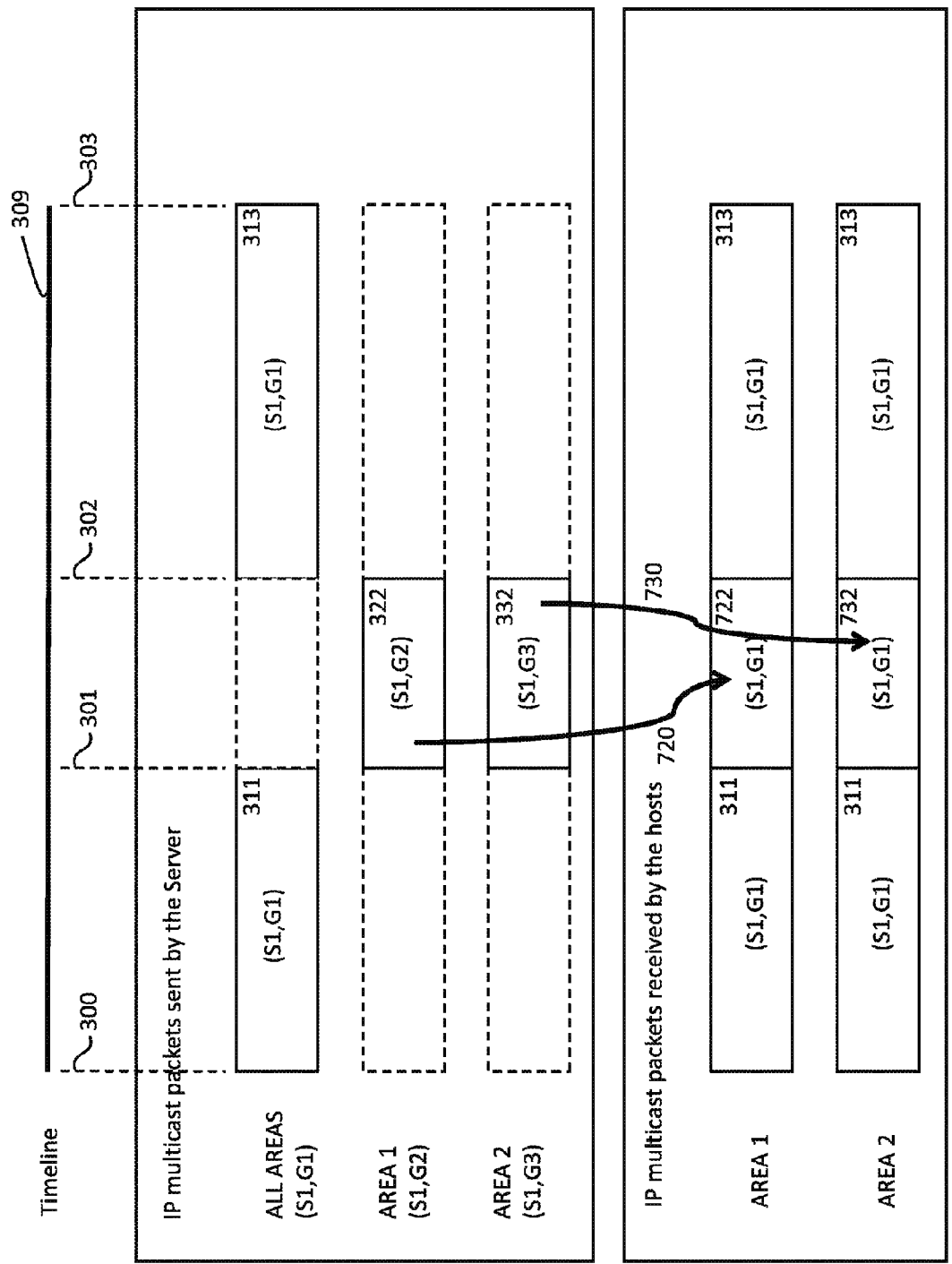
FIG. 7 illustrates an implementation where the IP packets addressed to the areas AREA1 and AREA2 are modified.

With continued reference to the example of FIG. 2, in one implementation router 230 modifies different types of multicast IP packets it receives and transmits them as a single type of multicast IP packets. FIG. 7 shows an example of such a process.

In one implementation router 230 receives the multicast IP packets 322 that correspond to the multicast channel (S1,G2) and 332 that correspond to the multicast channel (S1,G3). In one implementation, before transmitting the IP packets from the multicast channels (S1,G2) and (S1,G3) to the hosts of the areas AREA1 and AREA2 respectively through the different switches and proxies, the router 230 modifies the multicast destination IP address of the IP packets.

In one implementation, as shown by arrow 720, router 230 modifies the multicast destination IP address G2 of IP packets 322 by the multicast destination IP address G1 and transmits to the AREA1 the modified IP packets 722 that pertain to the multicast channel (S1,G1). In this way the modified IP packets 722 pertaining to the multicast channel (S1,G1) may pass through the switch 240 and the IGMP proxy 250 without problems and arrive at the hosts of the AREA1, where they will not be filtered by the operating system of the hosts as a result of modifying the multicast destination IP address in router 230.

In one implementation router 230 performs a similar process with the IP packets 332 from the multicast channel (S1,G3). In one implementation, as shown by arrow 730, packets 332 are modified to change the multicast destination IP address G3 for the IP address G1. In one implementation router 230 then transmits the modified IP packets 732 that pertain to the multicast channel (S1,G1) to the AREA2. In this way the modified IP packets 732 pertaining to the multicast channel (S1,G1) can pass through the switch 270 and the IGMP Proxy 280 without problems and arrive at the hosts of AREA2, where they will not be filtered by the operating system of the hosts as a result of the modification of the multicast destination IP address performed by the router 230.

Exemplary processes of modifying the IP addresses of the headers of some multicast IP packets, are explained by use of FIGS. 10, 11, 12 and 13, which correspond to the four examples of Table 4 previously explained.

In the examples of FIGS. 10 through 13, router 230 modifies different fields of the headers of some multicast IP packets. For greater clarity, FIGS. 8 and 9 show the structure of the headers of the IP packets according to one implementation.

Figure 8:
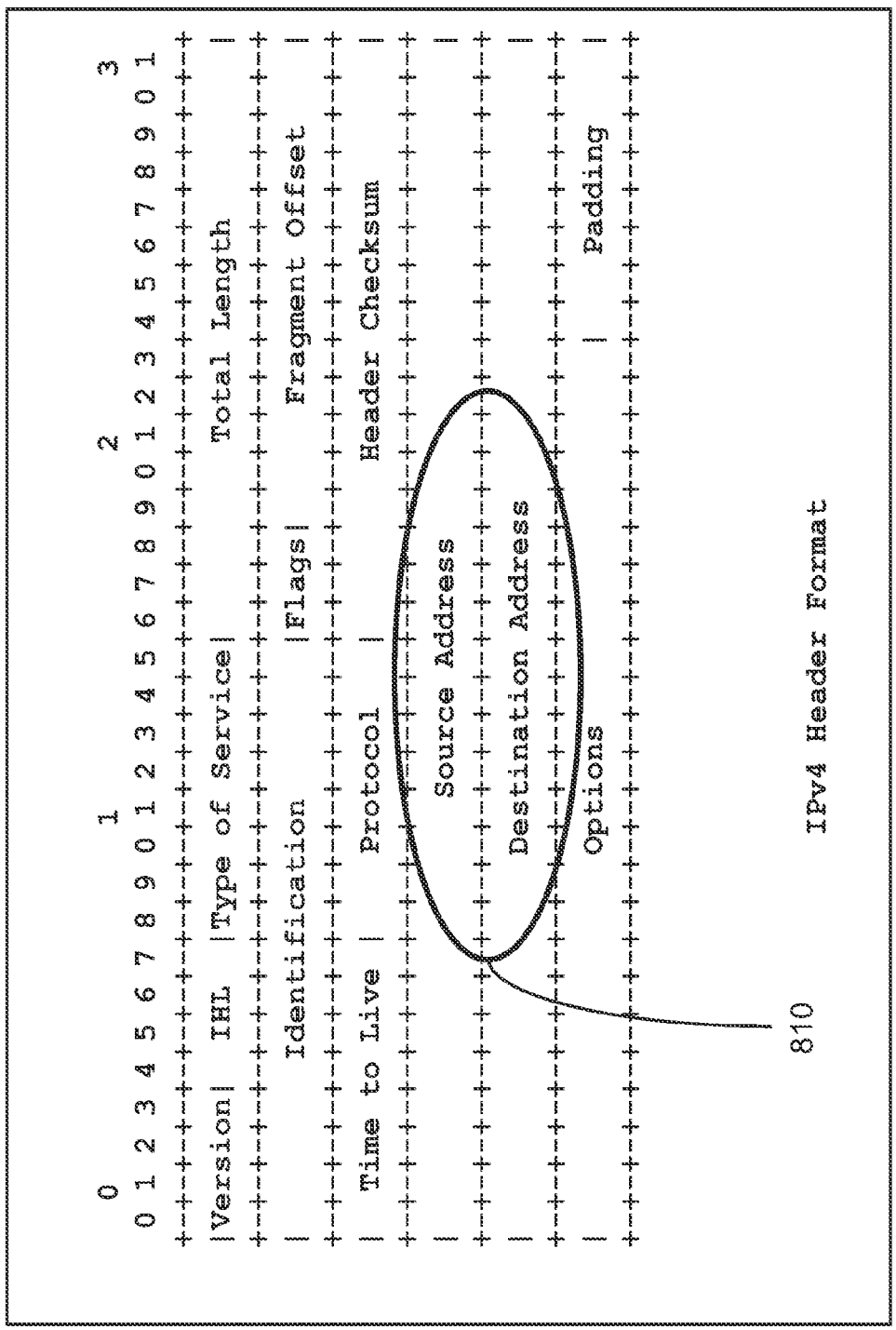
FIG. 8 illustrates a header of an IP packet of the IPv4 protocol.

FIG. 8 shows the structure of a header of an IPv4 type IP packet. The element 810 indicates the source and destination IP addresses of the IP packet called "Source Address" and "Destination Address." In the IPv4 protocol, the size of the IP addresses is 4 bytes.

Figure 9:
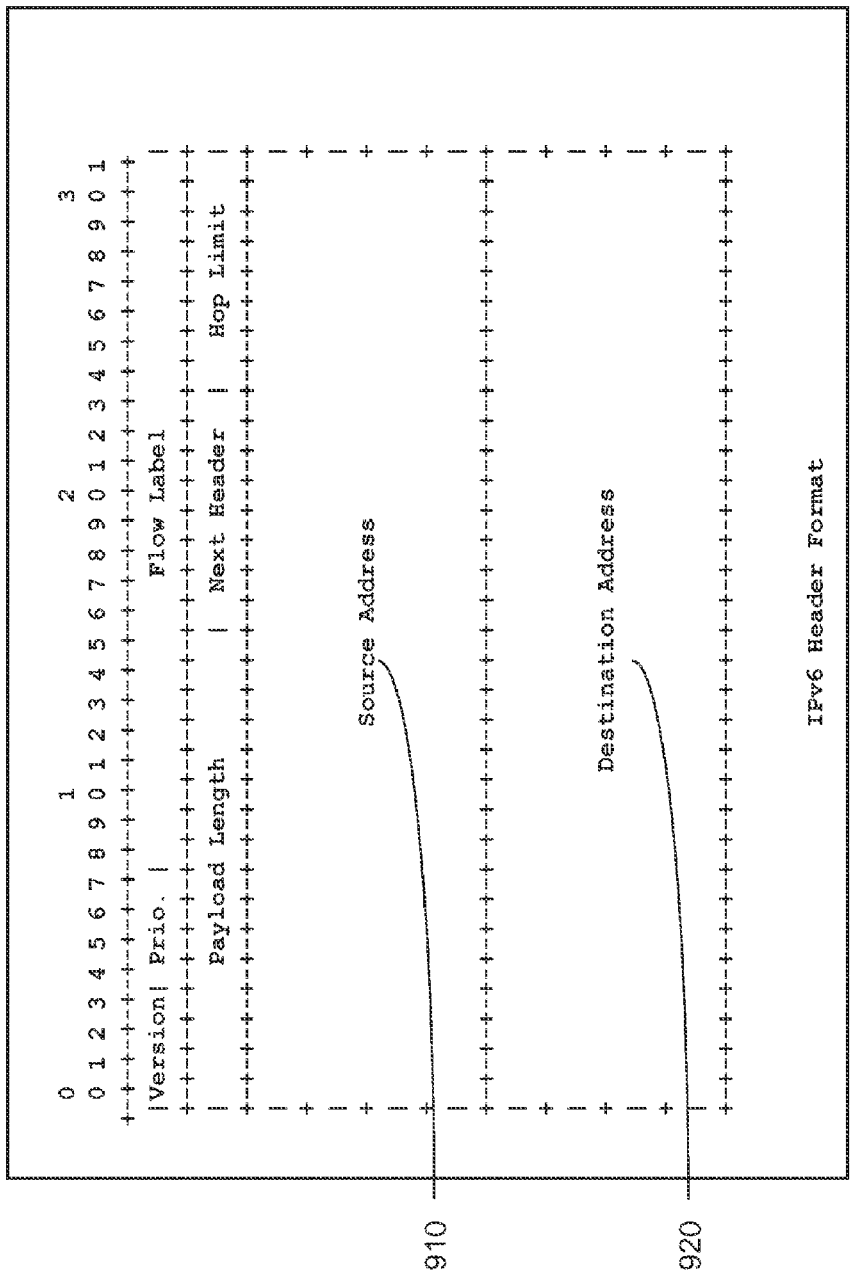
FIG. 9 illustrates a header of an IP packet of the IPv6 protocol.

FIG. 9 shows the structure of a header of an IPv6 type IP packet. The element 910 is the IPv6 source address and the element 920 is the IPv6 destination address. In the IPv6 protocol, the size of the IP addresses is 16 bytes.

Figure 10:
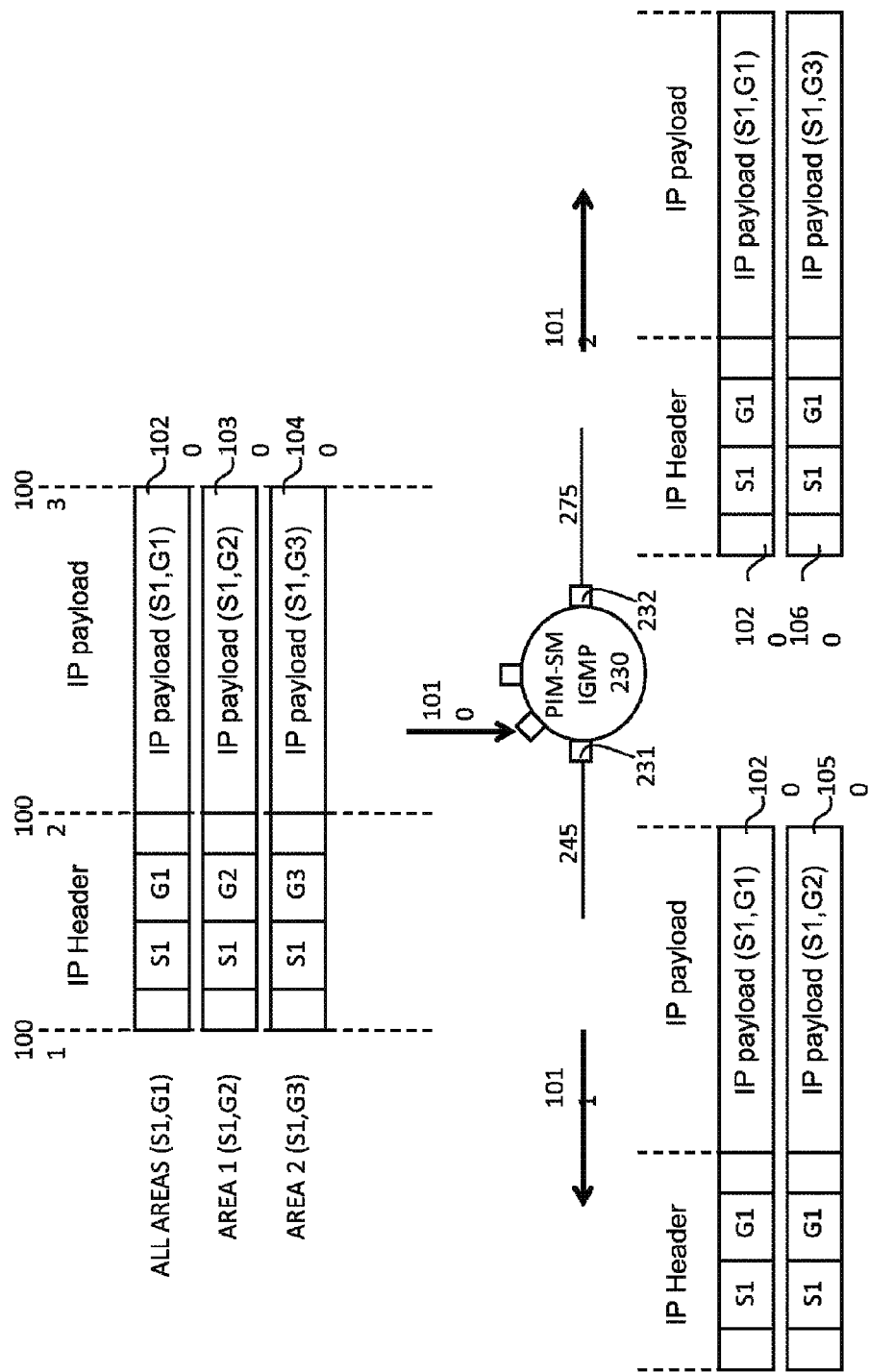
FIG. 10 illustrates an implementation that uses different multicast channels that have the same source IP address and different multicast destination IP addresses.

FIG. 10 shows an exemplary operation of router 230 according to the first example of Table 4 in which the router receives the traffic from the multicast channel (S1,G1) addressed to the two areas AREA1 and AREA2, the traffic from the multicast channel (S1,G2) being addressed to the AREA1 and the traffic from the multicast channel (S1,G3) being addressed to the AREA2.

The elements 1020, 1030 and 1040 show multicast IP packets that arrive at the router 230 and which correspond to the multicast channels (S1,G1), (S1,G2) and (S1,G3) respectively, where S1 is the source address of the IP packets and the multicast groups G1, G2 and G3 are the destination IP addresses.

In one implementation the IP packets are shown divided into two parts. A first part is located between the broken lines 1001 and 1002 and corresponds to the header or IP header that includes the source address and destination address fields. A second part is located between the broken lines 1002 and 1003 and corresponds to the data carried by the IP packet, which are usually called "IP payload."

In one implementation router 230 receives, by one of its network interfaces, the IP packets from the three multicast channels. In FIG. 10, this process is represented by the arrow 1010. The arrows 1011 and 1012 represent the transmission of IP packets from the router 230 by its network interfaces 231 and 232, respectively.

As previously explained, in one implementation router 230 stores information that makes it possible to determine by which network interface the traffic of each multicast channel should the transmitted. One method for storing the information is in the form of a table. For example, the router of FIG. 10 may use a table such as Table 3 previously explained.

In one implementation, when the router 230 of FIG. 10 receives an IP packet 1020 from the multicast channel (S1, G1), it transmits it by its network interfaces 231 and 232 without modifying the IP packets.

In one implementation, when router 230 receives an IP packet 1030 from the multicast channel (S1,G2), the router exchanges the multicast destination address G2 of the IP packet for the multicast address G1 and transmits the modified IP packet 1050 only by the network interface 231. Thus, in one implementation router 230 transmits by network interface 231 the IP packets 1020 and 1050 that now have in their headers the same source (S1) and destination (G1) IP addresses, thus avoiding the aforementioned problems with the switches, proxies and hosts.

In a similar way, in one implementation, when router 230 receives an IP packet 1040 from the multicast channel (S1, G3), the router exchanges the multicast destination address G3 of the IP packet for the multicast address G1 and transmits the modified IP packet 1060 only by the network interface 232. Thus, in one implementation router 230 transmits by network interface 232 the IP packets 1020 and 1060, which now have in their headers the same source (S1) and destination (G1) IP addresses.

Figure 11:
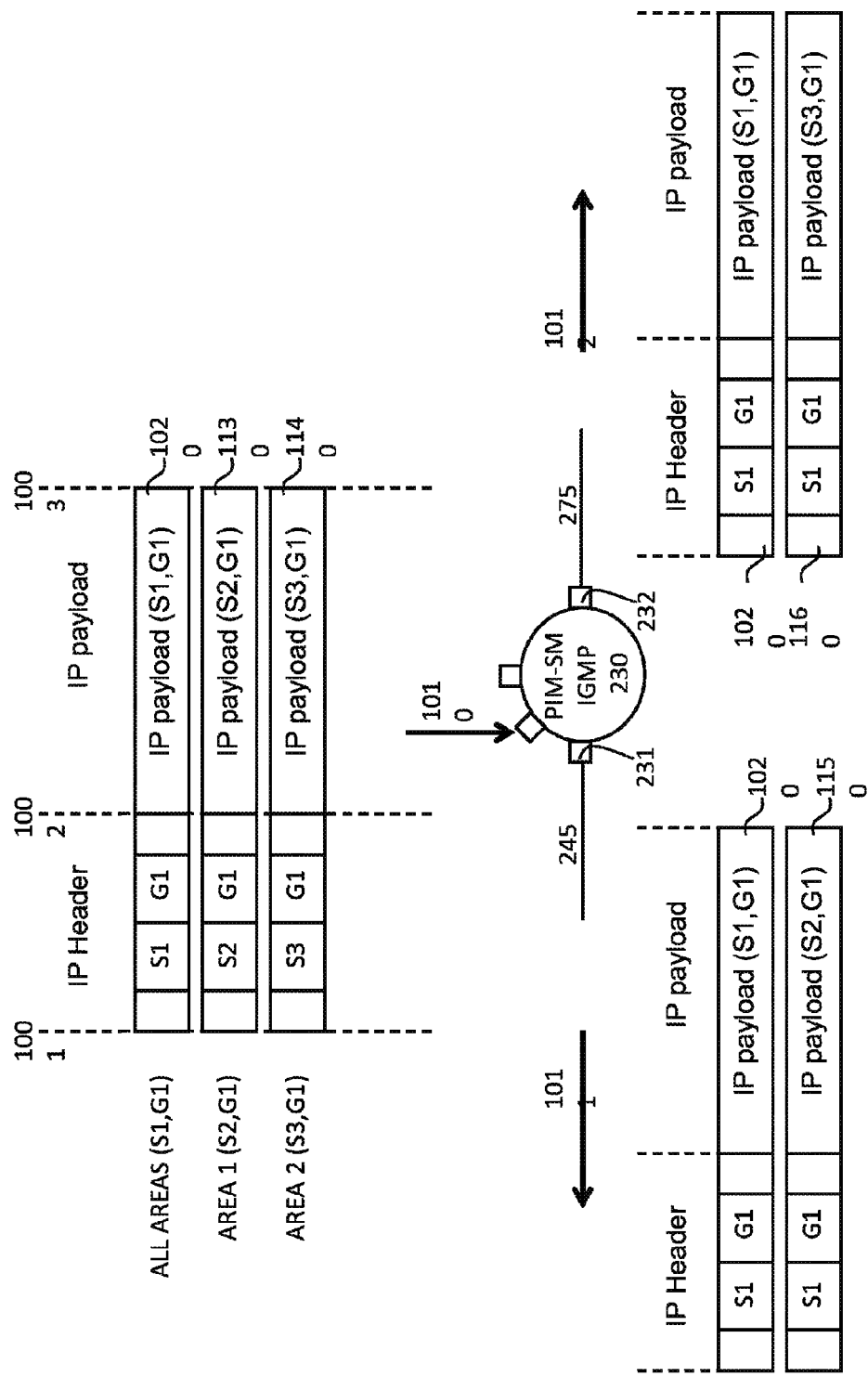
FIG. 11 illustrates an implementation that uses different multicast channels that have different source IP addresses and the same multicast destination IP address.

FIG. 11 shows an exemplary operation of router 230 where the router receives the traffic from the multicast channel (S1, G1) addressed to both areas AREA1 and AREA2, the traffic from the multicast channel (S2,G1) being addressed to the AREA1 and the traffic from the multicast channel (S3,G1) to the AREA2.

The elements 1020, 1130 and 1140 show multicast IP packets that arrive at the router 230 and which correspond to the multicast channels (S1,G1), (S2,G1) and (S3,G1) respectively, where S1, S2 and S3 are the IP source addresses and G1 is the multicast IP destination address.

In one implementation router 230 may store and use, for example, the following Table 5 for distributing the traffic associated with the channel (S1,G1) to each area:

TABLE 5

| CHANNEL | Interface 231 | Interface 232 |
| --- | --- | --- |
| (S1, G1) | (S2, G1) | (S3, G1) |

In one implementation, when router 230 receives an IP packet 1020 from the multicast channel (S1,G1), it transmits it by its network interfaces 231 and 232 without modifying the IP packets.

In one implementation, when router 230 receives an IP packet 1130 from the multicast channel (S2,G1), the router exchanges the source address S2 of the IP packet for the address S1 and transmits the modified IP packet 1150 only by the network interface 231. Thus, in one implementation, router 230 transmits by its network interface 231 the IP packets 1020 and 1150, which now have in their headers the same source (S1) and destination (G1) IP addresses, thus avoiding the aforementioned problems in the switches, proxies and hosts.

In a similar way, in one implementation, when router 230 receives an IP packet 1140 from the multicast channel (S3, G1), the router exchanges the source address S3 of the IP packet for the address S1 and transmits the modified IP packet 1160 only by the network interface 232. Thus, in one implementation, router 230 transmits by its network interface 232 the IP packets 1020 and 1160, which now have in their headers the same source (S1) and destination (G1) IP addresses.

Unlike the example of FIG. 10, where the router 230 modifies the destination IP address of some multicast packets, in the example of FIG. 11, the router 230 modifies the source IP addresses of some multicast packets.

As will be described later, in other implementations the router may modify both the source as well as the destination IP addresses of some multicast packets.

Figure 12:
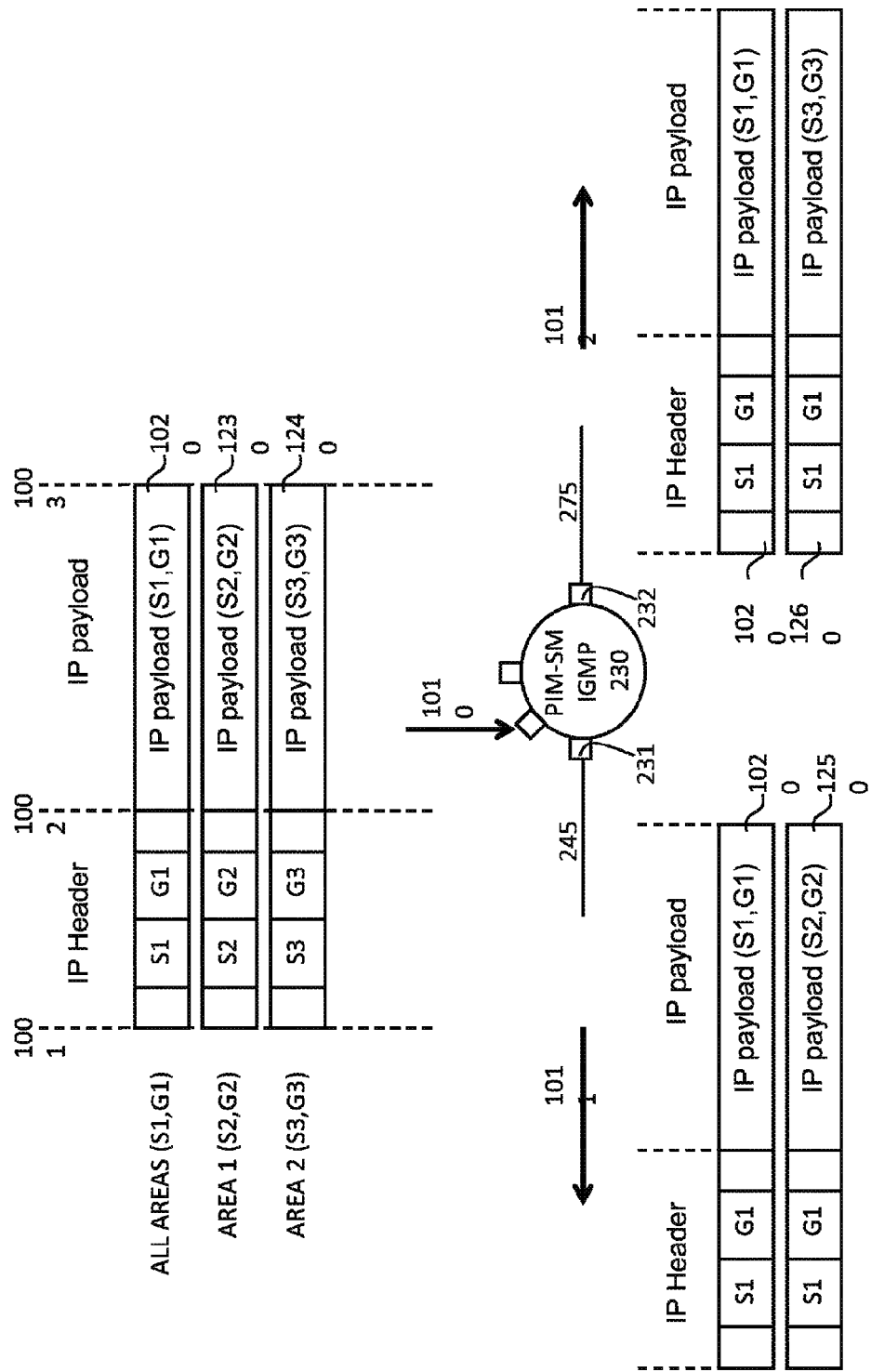
FIG. 12 illustrates an implementation that uses different multicast channels that have different source and destination IP addresses.

FIG. 12 shows an exemplary operation where router 230 receives the traffic from the multicast channel (S1,G1) addressed to both areas AREA1 and AREA2, the traffic from the multicast channel (S2,G2) being addressed to the AREA1 and the traffic from the multicast channel (S3,G3) addressed to the AREA2. The elements 1020, 1230 and 1240 show multicast IP packets that arrive at the router 230 and which correspond to the multicast channels (S1,G1), (S2,G2) and (S3,G3) respectively, where S1, S2 and S3 are IP source addresses and G1, G2 and G3 are the multicast destination IP addresses.

In one implementation router 230 may use stored information, for example, the following Table 6 to distribute the traffic associated with the channel (S1,G1) to each area:

TABLE 6

| CHANNEL | Interface 231 | Interface 232 |
|---------|---------------|---------------|
| (S1, G1) | (S2, G2) | (S3, G3) |

In one implementation, when router 230 receives an IP packet 1020 from the multicast channel (S1,G1), it transmits it by its network interfaces 231 and 232 without modifying the IP packets.

In one implementation, when router 230 receives an IP packet 1230 from the multicast channel (S2,G2), the router exchanges the source address S2 of the IP packet for the address S1 and also exchanges the multicast destination IP address G2 for the multicast address G1 and transmits the modified IP packet 1250 only by the network interface 231. Thus, in one implementation, router 230 transmits by network interface 231 the IP packets 1020 and 1250, which now have in their headers the same source (S1) and destination (G1) IP addresses, thus avoiding the aforementioned problems in the switches, proxies and hosts.

In a similar way, in one implementation, when router 230 receives an IP packet 1240 from the multicast channel (S3, G3), the router exchanges the source address S3 of the IP packet for the address S1 and also changes the multicast destination IP address G3 for the multicast destination address G1 and transmits the modified IP packet 1260 only by the network interface 232. Thus, in one implementation router 230 transmits by its network interface 232 the IP packets 1020 and 1260, which now have in their headers the same source (S1) and destination (G1) IP addresses.

Figure 13:
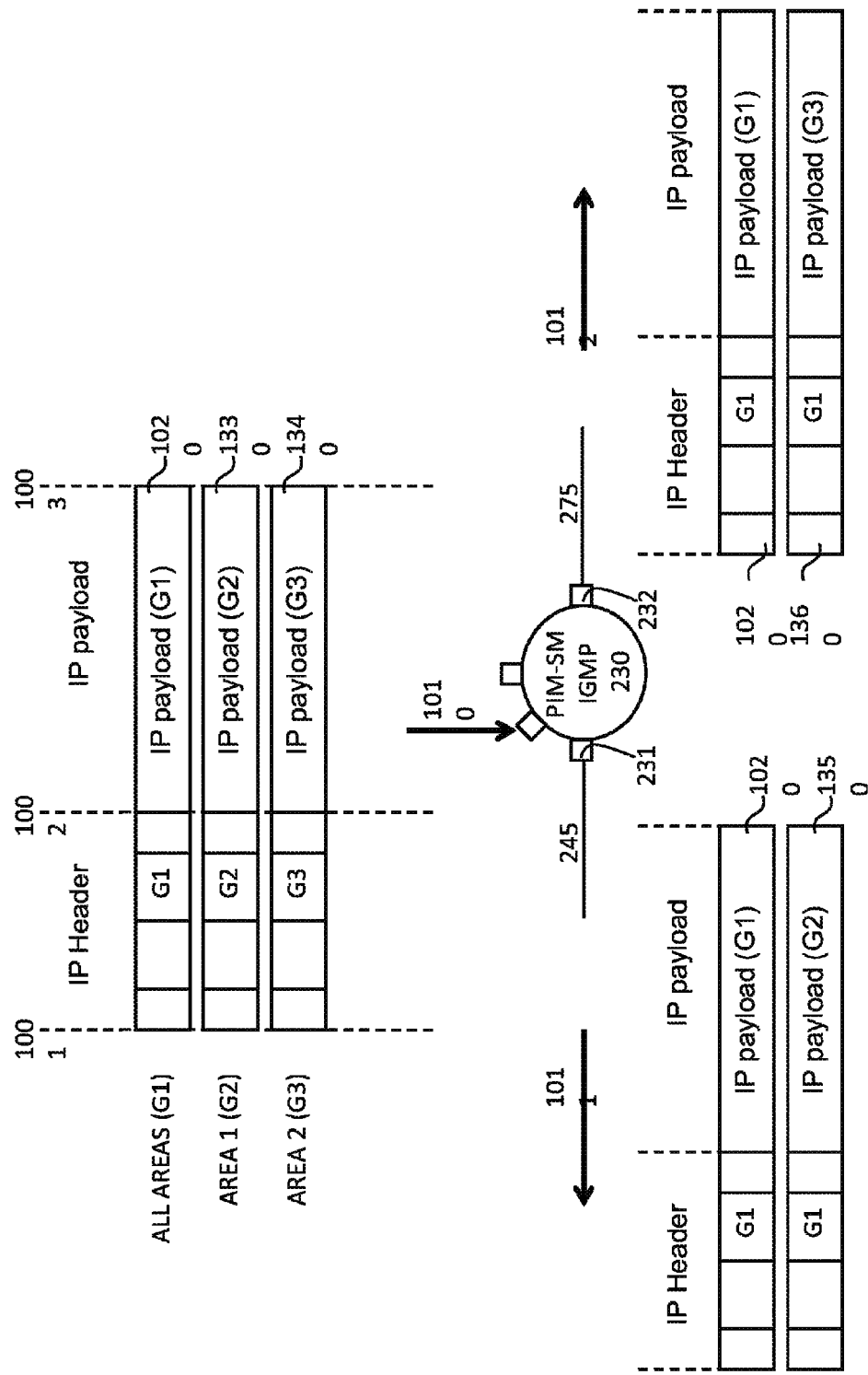
FIG. 13 illustrates an implementation that uses multicast groups.

FIG. 13 shows an exemplary operation in another implementation where router 230 receives the traffic from the multicast group (G1) addressed to the two areas AREA1 and AREA2, the traffic from the multicast group (G2) addressed to AREA1 and the traffic from the multicast group (G3) addressed to the AREA2. The elements 1020, 1330 and 1340 show multicast IP packets that arrive at the router 230 and which correspond to the multicast groups (G1), (G2) and (G3), respectively.

In one implementation router 230 may store information, for example, the following Table 7 to distribute the traffic associated with the multicast group G1 to each area

TABLE 7

| CHANNEL | Interface 231 | Interface 232 |
|---------|---------------|---------------|
| G1 | G2 | G3 |

In one implementation, when router 230 receives an IP packet 1020 from the multicast group (G1), it transmits the packet by its network interfaces 231 and 232 without modifying the IP packets.

In one implementation, when router 230 receives an IP packet 1330 from the multicast group G2, the router exchanges the multicast destination IP address G2 for the multicast destination address G1 and transmits the modified IP packet 1350 only by the network interface 231. In this way, in one implementation, router 230 transmits by network interface 231 the IP packets 1020 and 1350, which now have in their headers the same multicast destination address G1.

In a similar way, in one implementation, when router 230 receives an IP packet 1340 from the multicast group G3, the router exchanges the multicast destination IP address G3 for the multicast address G1 and transmits the modified IP packet 1360 only by the network interface 232. Thus, in one implementation router 230 transmits by its network interface 232 the IP packets 1020 and 1360, which now have in their headers the same multicast destination IP address (G1).

In one implementation, the IP packets that the server 214 transmits include a field that indicates the order of the packets. For example, the server 214 can use the UDP and RTP protocols to transmit multimedia content by the multicast channel (S1,G1) and when the server 214 begins to transmit localized content for the areas AREA1 and AREA2 by the multicast channels (S1,G2) and (S1,G3), it does so by incrementing the field called "Sequence Number" of the RTP header of the RTP packets, taking as an initial value for the Sequence Number field a value that is one unit greater than the last value of the Sequence Number field of the last RTP packet transmitted by the multicast channel (S1,G1).

In this way, when the IP packets arrive at the hosts after the router 230 modifies their destination IP address, for example by means of the example of FIG. 10, the hosts receive the multicast IP packets as though they had originated from a single multicast traffic. Thus, the transmission of different multimedia content to different geographic areas is a process that is transparent to the hosts.

The RTP (Real-time Transport Protocol) is described in the RFC 3550 specifications published on-line by the IETF (H. Schultzrinne et al., Request for Comment 3550, Network Working Group, July 2003, currently available on the Internet at http://www.ietf.org/rfc/rfc3550.txt).

For greater clarity the following is a brief explanation of the meaning of some fields that are found in RTP packets. Detailed information about the RTP protocol is in the RFC 3550 specifications.

The Payload field at the end of the RTP packet includes the content of the stream. For example, it can include sampled audio or sampled video.

The Sequence Number field of the RTP data packets is a whole 16-bit number that is incremented by one unit each time an RTP packet of a stream is transmitted. It is used primarily so that the receiver of the RTP packets can identify lost data packets and can organise the RTP packets that arrive at the receiver in an order different from the order in which they were sent.

In the exemplary implementations of FIGS. 10, 11 and 12, router 230, which has received IGMPv3 messages by its network interfaces 231 and 232 requesting the traffic from the multicast channel (S1,G1) receives, besides the multicast channel, other additional multicast channels with the localized content that corresponds to different areas. In one implementation router 230 sends Join(S,G) type PIM-SM messages in order to receive the traffic from the additional multicast channels.

Similarly, in the exemplary implementation of FIG. 13, router 230 receives, by its network interfaces 231 and 232, IGMP messages requesting the traffic from the multicast group G1 and the router 230 receives, in addition to the traffic from the multicast group G1, the traffic from the multicast groups G2 and G3 with the localised content that corresponds to the areas AREA1 and AREA2, respectively. In one implementation, router 230 sends Join (*,G) type PIM-SM messages in order to receive the traffic from the additional multicast groups G2 and G3.

In one implementation router 230 may send PIM-SM messages to request the traffic from the additional multicast channels, modifying the operation of the state machine that uses the PIM-SM protocol to send Join (S,G) type messages and which is explained in the section "4.5.7. Sending (S,G) Join/Prune Messages" in the above-mentioned RFC 4601. The state machine uses a macro called JoinDesired (S,G) that determines whether the PIM-SM router is in Joined state or Not Joined state for a specific multicast channel (Si,Gi). When the state is Joined for a specific multicast channel (Si,Gi), the PIM-SM router periodically sends Join(S1,G1) messages to receive the traffic from the multicast channel (Si,Gi).

The JoinDesired (S,G) macro is as follows:

```
bool JoinDesired(S,G) {
    return( immediate_olist(S,G) != NULL
        OR ( KeepaliveTimer(S,G) is running
            AND inherited_olist(S,G) != NULL ) )
}
```

The different macros used in the JoinDesired (S,G) function are explained in section "4.1.6 State Summarisation Macros" of the RFC 4601. In particular, the function uses the following macros:

```
immediate_olist(S,G) =
    joins(S,G) (+) pim_include(S,G) (-) lost_assert(S,G)
pim_include(S,G) =
    { all interfaces I such that:
        ( (I_am_DR( I ) AND lost_assert(S,G,I) == FALSE )
            OR AssertWinner(S,G,I) == me )
        AND local_receiver_include(S,G,I) }
```

The clause "local_receiver_include(S,G,I)" is true if the IGMP/MLD module has determined that there are hosts at the network interface I, which wish to receive traffic from the multicast channel (S,G).

Consequently, when a router responsible for transmitting multicast traffic receives an IGMPv3 message by a specific network interface I of the router requesting the traffic from a multicast channel (S,G), the interface will be included in the set of network interfaces pim_include(S,G) and also in the set of network interfaces called immediate_olist(S,G) and therefore the JoinDesired macro will have the Boolean value True since the set of interfaces immediate_olist(S,G) is not an empty set.

Thus, when the router that uses the IGMPv3 and PIM-SM protocols receives, by a network interface I, an IGMP message requesting the traffic from the multicast channel (S1, G1), the state of the state machine for sending Join (S1,G1) messages is the Joined state and the PIM-SM router periodically sends Join (S1,G1) type PIM-SM messages in order to receive the multicast traffic requested by the IGMPv3 message and to transmit it by the network interface I.

In one implementation the operation of the state machine used by the router 230 for sending Join (S,G) type PIM-SM messages is modified so that the router sends PIM-SM messages that request the additional channels that correspond to the areas AREA1 and AREA2.

Examples of the additional traffic associated with the multicast channel (S1,G1) that the router 230 requests in the different implementations has been indicated in Tables 3, 5 and 6.

In the different examples there may be additional multicast traffic associated with the multicast channel (S1,G1) that router 230 requests, for example by sending Join (S,G) type PIM-SM messages.

For example, in the example of Table 3, when router 230 receives an IGMPv3 message requesting the traffic from the multicast channel (S1,G1), the router 230 in one implementation sends PIM-SM messages to request the traffic from the channels (S1,G1), (S1,G2) and (S1,G3).

In one implementation router 230 modifies the function of the clause "local_receiver_include(S,G,I)" in such a way that it is true if the IGMP/MLD module has determined that there are hosts at the network interface I that wish to receive the traffic from the multicast channel (S,G) and it is also true if, in the example of Table 3, the IGMP/MLD module of the router has determined that there are hosts at the interface I that wish to receive the traffic from the multicast channel of the first column of Table 3 (S1,G1) and that there is a column in table 3 that includes the channel (S,G).

Thus, in one implementation, the clause "local_receiver_include(S,G,I)" no longer depends solely on the IGMP messages received at the network interface I, but also on the content of a table of the router, for example Table 3.

For example, if at the network interface 231 the router receives an IGMPv3 message requesting the multicast channel (S1,G1), then the clause "local_receiver_include(S1,G1, 231)" in one implementation will be true because it has received an IGMPv3 message requesting the traffic from the multicast channel (S1,G1) of the first column. In addition, however, in one implementation at the network interface 231 the clause "local_receiver_include(S1,G2,231)" will be true and at the network interface 232 the clause "local_receiver_include(S1,G3,232)" will be true. In this way, router 230 may send the Join (S1,G2) and Join (S1,G3) PIM-SM messages as well as the Join (S1,G1) message. The same or similar process, as can be applied to the examples of Tables 5 and 6 to request the multicast traffic from the additional channels (S2, G1) and (S3,G1) in Table 5 and (S2,G2) and (S3,G3) in Table 6.

Although the implementations as explained, uses the "local_receiver_include" clause to request by PIM-SM messages the traffic from the multicast channels of Table 3, other implementations are possible. One such example is modifying the macros called "immediate_olist" or "pim_include" or the JoinDesired (S,G) function itself.

For the sake of simplicity, the examples of Tables 3, 5, 6 and 7 show only one row, however, other implementations involving numerous rows and associate different additional multicast channels with a plurality of multicast channels are contemplated.

In one implementation, router 230 receives by a specific network interface, a first message in a multicast protocol that requests the multicast channel from the first column of a row of a table, the router uses a multicast routing protocol to request the multicast traffic from at least another multicast channel or group that corresponds to the same row of the table and where the column of the table is indicated by the network interface of the router to which the first message arrived.

As explained in the different examples, the first message can be an IGMP protocol message and the router can use the PIM-SM protocol to request the additional multicast traffic, although other implementations are possible with the use of different multicast routing protocols.

In one implementation, when router 230 receives by a specific network interface a first message that requests the multicast channel from the first column of a row of the table, the router uses the PIM-SM routing protocol to request the multicast traffic from at least another multicast channel or group that corresponds to the same row of the table and where the column of the table is indicated by the network interface of the router to which the first message arrived. In one implementation, to do this, the router may modify, for example, the functioning of the "immediate_olist (S,G)", "joins (S,G)" macros, or the JoinDesired(S,G) function. In this way, in one implementation a multicast router using the PIM-SM protocol may be used to receive messages that request a first multicast traffic and transmit messages that request the first multicast traffic and additional multicast traffic.

The implementation of the example of Table 7 is somewhat different from the implementations of the examples of Tables 3, 5 and 6 because it uses multicast groups instead of multicast channels.

The messages that a PIM-SM router uses to request multicast traffic from a multicast group are the Join (*,G) type messages. The state machine that uses the PIM-SM protocol to send Join (*,G) type messages is explained in section "4.5.6 Sending (*,G) Join/Prune Messages" of the RFC 4601 and its functioning can be modified in a similar way to the previously explained implementations.

In one implementation, when router 230 receives by a specific network interface, a first message in a multicast protocol that requests the traffic from a multicast group of the first column of a row of the table, the router uses a multicast routing protocol to request the multicast traffic from at least one other multicast group that corresponds to the same row of the table, and where the column of the table is indicated by the network interface of the router where the first message has arrived.

When a host or a router wants to receive traffic from a specific multicast group G, the following technical problem must be solved: the host only knows the address of the multicast group G and does not know the IP addresses of the sources of that group G that are transmitting data. There are different multicast communication protocols between routers that solve this problem in different ways. Currently, the PIM-SM protocol is primarily applied and the problem is solved by designating a router called Rendezvous Point, hereinafter RP router, as responsible for knowing all sources of a same multicast domain (set of routers that use the same RP router). In order to ascertain the IP addresses of the sources, each router establishes a first multicast communication with the RP router so that the RP router sends it the requested multicast traffic. When the router receives the first data of the multicast traffic, it detects the IP addresses of the sources. Then, the last router, i.e. the router that directly receives the IGMP messages originating from the hosts, attempts to receive the data directly from the sources using the SPT (Shortest Path Tree) that establishes the shortest path through the network, called the SPT path. When the router begins to receive the data in duplicate form, both through the RP router as well as directly through the SPT path, it cuts communication with the RP router and preserves only direct communication through the SPT path.

In the example of FIG. 2, the RP router can be router 220. Initially, the router 230 can receive traffic from a multicast group through the RPT tree formed by the routers 210 and 220, since only the RP router 220 knows the IP addresses of the sources.

When specific conditions are met, which are explained below, the router 230 can change and use the SPT tree in order to receive the multicast traffic by the shortest SPT path which, in FIG. 2, is the network 205, which directly joins the routers 210 and 230, and the router 230 abandons the reception through the RPT tree. RPT and SPT trees may be used to transmit multicast traffic from a multicast group G or a channel (S,G).

The conditions that the PIM-SM protocol establishes for changing from the RPT tree to an SPT tree for a specific channel (S,G), i.e., the channel defined by the source S within the multicast group G, are detailed in the RFC 4601 specifications, specifically in section 4.2.1 called "Last Hop Switchover to the SPT", which defines a function called CheckSwitchToSpt(S,G):

```
void
CheckSwitchToSpt(S,G) {
    if ( ( pim_include(*,G) (−) pim_exclude(S,G)
            (+) pim_include(S,G) != NULL )
        AND SwitchToSptDesired(S,G) ) {
            # Note: Restarting the KAT will result in
            # the SPT switch set KeepaliveTimer(S,G) to
        # Keepalive_Period
    }
}
```

The CheckSwitchToSpt(S,G) function has a configurable part, defined by the configurable function "SwitchToSptDesired(S,G)", and a non-configurable part. The change from the RPT tree to the SPT tree is performed when both parts of the conditions are met.

Usually, the configurable function SwitchToSptDesired(S, G)" is used to establish a traffic volume threshold from the source S, so that the change from the RPT tree to the SPT tree is not carried out if the threshold has not been exceeded.

The non-configurable part, which forms part of the programming code of the PIM-SM protocol, is as follows:

(pim_include(*,G) (−) pim_exclude(S,G)(+) pim_include(S, G)!=NULL)

This non-configurable condition establishes that a router only changes from the RPT tree to the SPT tree for a specific channel (S,G) if there is a network interface of the router that has received an IGMP INCLUDE (S,G) message, or if there is a network interface of the router that has received an IGMP type message that indicates that it wants to receive the traffic from all sources of the group G and the network interface has not received an IGMP EXCLUDE (S,G) message. Since this non-configurable condition refers solely to IGMP messages, the only router that can initiate a change to the SPT tree in order to establish a direct connection with the input router of the channel (S,G) is the router that receives the IGMP messages, i.e. the router 230 in the example of FIG. 2. In the routers that do not receive IGMP messages directly by one of its network interfaces, this condition will never occur, so these routers will never initiate a change to the SPT tree.

When a PIM-SM router that receives multicast traffic through the RPT tree changes to the SPT tree, it does so sending Join (S,G) type messages. This occurs because the JoinDesired (S,G) function is true.

As previously explained, the JoinDesired (S,G) function is as follows:

```
bool JoinDesired(S,G) {
    return( immediate_olist(S,G) != NULL
        OR ( KeepaliveTimer(S,G) is running
            AND inherited_olist(S,G) != NULL ) )
}
```

In this function, there is a timer called KeepaliveTimer (S,G) that is responsible for maintaining the Joined state in the state machine during a specific period of time (default 210 seconds) from the moment the router receives the last IP packet of data from the multicast channel (S,G), even in the absence of Join (S,G) type messages. This timer is reset to its default value, for example, 210 seconds, each time the router receives a packet of data from the multicast channel (S,G).

This functioning of the PIM-SM protocol, which stops using the SPT tree to receive packets from a multicast channel (S,G) in order to return using the RPT tree if a specific amount of time has passed without a router receiving packets from the multicast channel (S,G), can involve a problem in the implementation represented in FIGS. 10 through 13.

For example, in the example of FIG. 13 the problem appears if a specific amount of time has passed without the server 214 transmitting traffic from the channels G1, G2 or G3 because the PIM-SM routers will change to the RPT tree and this can cause the IP packets from the multicast groups G1, G2 and G3 to take longer to arrive at the router 230.

To avoid this problem, in one implementation the default values of the KeepaliveTimer timer of the multicast channels that use the multicast groups G1, G2 and G3 take a sufficiently high value so that the change from SPT to RPT in the routers does not occur. For example, a value of 7200 seconds, equal to two hours, can avoid this problem if not more than 7200 seconds pass without the server transmitting traffic from the groups G1, G2 and G3.

In another implementation the server 214 may avoid this problem by sending some IP packets from the groups G1, G2 and G3, which prevent the KeepaliveTimer timers from reaching zero. These packets can use, for example, a specific port of the UDP protocol and the router 230 can discard the IP packets it receives which their function is only to maintain the Joined state in the PIM-SM routers of the SPT trees that transmit each multicast group G1, G2 and G3. Similar solutions are also applicable to the examples of FIGS. 10 through 12.

Returning to the implementations of FIGS. 10, 11, 12 and 13 that use respectively the examples Table 3, 5, 6 or 7, other methods ways of configuring or storing data in the router 230 are possible. Moreover, as discussed above, the use of a table is not necessary.

In one implementation a table is manually inserted in the router 230, for example, by connecting a computer to the router and executing some commands that cause a storing of the table in router 230.

In one implementation router 230 has an SNMP agent and an MIB database, and the SNMP protocol is used to communicate with a control station that allows a table to be configured.

SNMP is a set of standards for managing network equipment. SNMP was adopted years ago as a standard for TCP/IP networks and has become the most widely used tool for managing networks and network-connected devices. In 1991, a supplement was added to the SNMP, called Remote Network Monitoring (RMON). RMON extends SNMP capacities to include the management of local area networks (LANs) as well as managing the devices connected to those networks. There are many updates and new versions of the SNMP protocol. In 1995 an update was published called SNMPv2. In 1998 the last version of this set of standards was published, called SNMPv3, which improved all aspects related to security.

An SNMP management system typically has the following elements:

At least one control or management station, traditionally called "SNMP Manager" or "management station". Henceforth, the term "control station" will be used to refer to this element.

Several nodes (potentially many), each of which uses one application, traditionally called an SNMP agent, to communicate with the control station. Every SNMP agent has access to the configuration information for its node and can send and receive messages from the control station.

A communications protocol to communicate between the control station and the SNMP agents.

SNMP agents manage the resources for nodes by using objects that represent these resources. Every object is typically a variable with data that represents an aspect of the managed node. The set of objects for a specific network node is called the "Management Information Base" or MIB.

MIBs are standardized for each type of network device. For example, a particular MIB is used for various switches from different manufacturers.

An SNMP control station monitors the operation of equipment by obtaining the value of the objects found in the equipment's MIB. To do so, the SNMP control station communicates with the SNMP agent and requests that information. An SNMP control station can also modify values from the objects found in this equipment's MIB, sending a message to the SNMP agent for that equipment so it can modify the values.

MIBs are specifications that contain definitions to manage and maintain information for a specific type of network equipment so that network equipment, even from different manufacturers, can be monitored, configured and controlled remotely. The rules that set the language used to write MIBs are defined in specifications RFC2578 (McCloghrie et al., Internet Engineering Task Force, Request for Comments 2578, "The structure of Management Information Version 2, SMIv2", April 1999, currently available on the Internet at http://www3.tools.ietf.org/html/rfc2578) and specifications RFC2579 (McCloghrie et al., Internet Engineering Task Force, Request for Comments 2579, "Textual Conventions for SMIv2", April 1999, currently available on the Internet at http://www3.tools.ietf.org/html/rfc2579).

SMIv2 uses a small part of the instructions from a language called Abstract Syntax Notation One (ASN.1).

ASN.1 is a formal, standardized language and is important to the SNMP protocol for many reasons. Firstly, it is used to specify data syntaxes. It is also used to specify SNMP protocol messages, called "Protocol Data Units" (PDUs). Lastly, it is used to define the MIB.

Usually, to make a new control protocol compatible with an SNMP control system, the systems called "SNMP Proxies" are often used. The function of an SNMP Proxy is to act as intermediary between the control station that uses the SNMP management system and the new device that uses a different or its own control protocol. For this purpose, the different messages and data from the new control protocol are converted to SNMP messages and vice versa. That is, the messages and data from the SNMP protocol are converted to the device's own control system.

The IGMPv3 multicast routers as well as the PIM-SM multicast routers of the current state of the art usually have SNMP agents.

A description of the MIB database of an SNMP agent for PIM-SM routers is provided in the document "Protocol Independent Multicast MIB draft-ietf-pim-mib-v2-10.txt," published on line by the IETF (R. Sivaramu et al., Internet Engineering Task Force, PIM Working Group, September 2007, currently available on-line at the Internet address ftp://ftp.rfc-editor.org/in-notes/internet-drafts/draft-ietf-pim-mib-v2-10.txt).

The definition of the MIB database of an SNMP agent for IGMPv3 routers is described in the document "Multicast Group Membership Discovery MIB", published on-line by the IETF (J. Chesterfield et al., Internet Engineering Task Force, Magma Working Group, September 2008; currently available on-line at the Internet address http://www.ietf.org/internet-drafts/draft-ietf-magma-mgmd-mib-12.txt).

In one implementation, a MIB database of an SNMP agent of a PIM-SM router stores the information from Tables 3, 5, 6 or 7. In order to simplify the explanation and since the SM1v2 language is known to a person skilled in the art, the code in the SM1v2 language for the improved MIB used by the improved SNMP agents of the present developments is not included in the present explanation.

In another implementation the SNMP protocol is used to configure the way in which the server 214 transmits the different types of multicast traffic. For example, the server 214 may be configured to use the different types of multicast traffic explained in FIGS. 10, 11, 12 and 13.

In one implementation, an IGMP proxy receives an IGMP message requesting a first type of multicast traffic by a network interface downstream from the IGMP proxy connected to a host; the IGMP proxy associates the first type of requested multicast traffic with a second type of multicast traffic on the basis of the first type of multicast traffic and the downstream interface or the source IP address of the IP packet that carries the IGMP message; the IGMP proxy sends IGMP messages by its upstream network interface to request the first and second type of multicast traffic and when it receives the multicast IP packets from the first and second type of multicast traffic, it modifies the IP packets of the second type of multicast traffic so that the source and destination IP addresses of the header of the IP packets of the second type of multicast traffic are the same IP addresses as those of the first type of multicast traffic in processes similar to those explained in FIGS. 10 to 13 but with the difference that the process is carried out in the IGMP proxy instead of the router 230. The IGMP proxy then transmits to the host the unmodified IP packets of the first type of multicast traffic and the modified IP packets of the second type of multicast traffic.

For example, in the system of FIG. 2, in one implementation the IGMP proxy 250 receives, by the downstream network interface connected to the host 262, an IGMPv3 message of the type IS_INCLUDE(G1, {S1}), requesting the traffic from the multicast channel (S1,G1). In one implementation the IGMP proxy 250 associates the first type of multicast traffic (S1,G1) with a second type of multicast traffic such as, for example, the traffic from the multicast channel (S2,G1), and the IGMP proxy transmits by its upstream network interface an IGMPv3 message of the type IS_INCLUDE(G1,{S1,S2}) in order to receive the traffic from both multicast channels (S1,G1) and (S2,G2) and the message arrives at the router 230, which implements, for example, the IGMPv3 and PIM-SM protocols. In one implementation, router 230 is a standard state of the art router and uses the standard PIM-SM protocol to request traffic from the channels (S1,G1) and (S2,G1) requested by the IGMP proxy 250.

In one implementation, when the IGMP proxy receives the IP packets of the multicast channels (S1,G1) and (S2,G1), it performs a function similar to the one explained in FIG. 11. The IGMP Proxy transmits, by its downstream interface, the unmodified IP packets of the multicast channel (S1,G1) and modifies the source IP address S2 of the IP packets from the multicast channel (S2,G1), substituting the address S2 for the address S1 and transmits the modified IP packets by its downstream network interface to the host 262.

In one implementation an IGMP router receives an IGMP message requesting a first type of multicast traffic from a downstream network interface and the IGMP router associates the first type of requested multicast traffic with a second type of multicast traffic on the basis of the first type of multicast traffic and the downstream interface or the source IP address of the IP packet that carries the IGMP message.

In one implementation the IGMP router sends PIM messages by its upstream network interface to request the first and second type of multicast traffic and when it receives the multicast IP packets from the first and second type of multicast traffic, it modifies the IP packets of the second type of multicast traffic so that the source and destination IP addresses of the header of the IP packets of the second type of multicast traffic are the same IP addresses as those of the first type of multicast traffic in a process, such as those explained in the examples of FIGS. 10 through 13 but with the difference that the process of associating the second type of multicast traffic is carried out in the IGMP protocol of the router 230 instead of the PIM protocol of the router 230. In one implementation the IGMP router then transmits to the host the unmodified IP packets of the first type of multicast traffic and the modified IP packets of the second type of multicast traffic.

For example, in the system of FIG. 2, the IGMP router 230 receives by a downstream network interface an IGMPv3 message of the type IS_INCLUDE(G1,{S1}), requesting the traffic from the multicast channel (S1,G1). In one implementation the IGMP router 230 associates the first type of multicast traffic (S1,G1) with a second type of multicast traffic such as, for example, the traffic from the multicast channel (S2,G1), and the IGMP router stores in its IGMPv3 state table a list of sources comprising S1 and S2 associated with the multicast group G1, as if the router had received a message of the type IS_INCLUDE (G1, {S1,S2}). In one implementation the router 230 implements, for example, the IGMPv3 and PIM-SM protocols. In this case, the router 230 uses the standard PIM-SM protocol to request traffic from the channels (S1,G1) and (S2,G1).

In one implementation, when the IGMP router 230 receives the IP packets of the multicast channels (S1,G1) and (S2,G1), the IGMP router performs a function similar to the one explained in the example of FIG. 11. The IGMP router transmits, by its downstream interface, the unmodified IP packets of the multicast channel (S1,G1) and modifies the source IP address S2 of the IP packets from the multicast channel (S2,G1), substituting the address S2 for the address S1 and transmits the modified IP packets by its downstream network interface.

Although the preceding implementation is based on the example of FIG. 11, other implementations are also contemplated, including without limitation, those of examples FIGS. 10, 12 and 13.

Turning again to FIG. 2, in one implementation, as indicated by dashed line 206, multicast traffic may be transmitted directly from a source or set of sources to router 230 without passing through any intervening equipment.

In one implementation a switch that performs an IGMP snooping function receives an IGMP message requesting a first type of multicast traffic by a port of the switch connected to a host; the switch associates the first type of requested multicast traffic with a second type of multicast traffic as a function of the first type of multicast traffic and of the port of the switch or the source IP address of the IP packet that carries the IGMP message. In one implementation the switch sends IGMP messages by all of its ports connected to IGMP routers to request the first and second type of multicast traffic. In one implementation when the switch receives the multicast IP packets of the first and second type of multicast traffic, it modifies the IP packets of the second type of multicast traffic so that the source and destination IP addresses of the header of the IP packets of the second type of multicast traffic are the same IP addresses as those of the first type of multicast traffic in a process similar to those explained in the examples of FIGS. 10 to 13 but with the difference that the process is performed in the switch instead of the router 230. In one implementation the switch then transmits, by the port where it received the IGMP message, the unmodified IP packets of the first type of multicast traffic and the modified IP packets of the second type of multicast traffic.

In the IGMP proxy, IGMP router and snooping switch, the information that allows them to associate a second type of multicast traffic with the first type of multicast traffic can be configured in different ways. In one implementation the configuration is performed by means of the SNMP protocol.

Like implementations may also be executed by hosts. For example, in one implementation, a host sends a first IGMP message requesting a first type of multicast traffic by its network interface and the host itself associates the first type of multicast requested traffic with a second type of multicast traffic and sends an IGMP message to request the second type of multicast traffic.

In one implementation, when the first type of multicast traffic and the second type of multicast traffic use the same multicast group address, the host can request both types of multicast traffic with only one IGMP message. This is explained in more detail below with the use of Example 2 of Table 8.

In one implementation, the host can associate the first type of multicast traffic and the second type of multicast traffic on the basis of the first type of multicast traffic and information stored in the host. For example, the following Table 8 shows examples of different implementations that the host can use to associate a first type of multicast traffic with a second type of multicast traffic

TABLE 8

|  | FIRST | SECOND |
|---|---|---|
| Example 1. | (S1, G1) | (S1, G2) |
| Example 2. | (S1, G1) | (S2, G1) |
| Example 3. | (S1, G1) | (S2, G2) |
| Example 4. | G1 | G2 |

According to a first example, Example 1, different destination IP addresses or addresses of multicast groups G1 and G2 are used for each type of multicast traffic requested by the host. For example the host may send the following two IGMP messages: IS_INCLUDE (G1, {S1}) and IS_INCLUDE (G2, {S1}) to request the first type of multicast traffic and the second type of multicast traffic, respectively.

According to a second example, Example 2, the host requests traffic from the same multicast group G1 but distinguishes the type of traffic using the different source IP addresses 51 and S2. For example the host may send the following IGMP message IS_INCLUDE (G1,{S1,S2}) to request the first type of multicast traffic and the second type of multicast traffic with only one IGMP message.

According to a third example, Example 3, the host requests traffic from different source IP address and a different multicast destination IP address or multicast group: (S1,G1), (S2,G2). For example the host may send the following two IGMP messages: IS_INCLUDE (G1, {S1}) and IS_INCLUDE (G2, {S2}) to request the first type of multicast traffic and the second type of multicast traffic, respectively.

According to a fourth example, Example 4, different types of multicast traffic are distinguished by using different multicast groups G1, G2. For example the host may send the following two IGMP messages: IS_EXCLUDE (G1,{ }) and IS_EXCLUDE (G2,{ }) to request the first type of multicast traffic and the second type of multicast traffic, respectively.

Although the implementations of Table 8 show only a second type of multicast traffic associated with the first type of multicast traffic, in other implementations multiple types of multicast traffic may be associated with the first multicast traffic.

In one implementation the information that the host stores to associate the first type of multicast traffic with a second type of multicast traffic is dynamic information that changes with the time and the host receives and stores the information that associates the second type of multicast traffic with the first type of multicast traffic. For example, in one implementation the host may be a mobile phone and the second type of multicast traffic may change according to the location of the mobile phone. In one implementation the second type of multicast traffic may change as a result of an input by the user of the host device, such as via a user interface. In one implementation the second type of multicast traffic may change as a result a reconfiguration of data residing or otherwise stored in the host device.

In one implementation the host receives the information of the second type of multicast traffic in one or more multicast packets of the first type of multicast traffic. For example, the first type of multicast traffic may use the UDP protocol and a specific port may be used to transmit to the host the information that identifies the second type of multicast traffic, for example the source IP address S and the multicast IP address G of the second type of multicast traffic (S,G).

According to other implementations, the host may receive the information of the second type of multicast traffic establishing a unicast communication with another equipment, for example the server 214, and the host actualizes and stores the information about the second type of multicast traffic. The unicast communication may use different protocols like SNMP, IP, TCP/IP, UDP, XML, SOAP, HTTP and others.

In one implementation, when the host receives the IP packets of the two types of multicast traffic, for example the multicast channels (S1,G1) and (S2,G1), the operating system of the host modifies the source IP address S2 of the IP packets from the multicast channel (S2,G1), substituting the address S2 for the address 51 and transmits the modified IP packets to the application that has requested the multicast channel (S1,G1). In other implementations the header of the packets of the second type of multicast traffic may be modified in different forms as explained before.

In one implementation, the host executes a specific software application that comprises executable instructions that when executed in the host associate the first type of multicast traffic with a second type of multicast traffic and send IGMP message or messages to request the first type and the second type of multicast traffic. In one implementation the specific software application may receive the information of the second type of multicast traffic associated with the first type of multicast traffic receiving unicast communications or multicast communications.

In one implementation, the specific software application modifies the source IP address S2 of the IP packets from the multicast channel (S2,G1), substituting the address S2 for the address S1 and transmits the modified IP packets to the application that has requested the multicast channel (S1,G1). In other implementations the header of the packets of the second type of multicast traffic may be modified in different forms as explained before. In one implementation, the specific software application transmits the multicast packets to another application, for example a media player application that reproduces content in the host, the content being transmitted in the multicast packets.

What is claimed is:

1. A method comprising: receiving in a first network interface of a router a first request for a first type of multicast traffic in a first multicast routing protocol, storing in the router for the first network interface and the first type of multicast traffic a second type of multicast traffic, transmitting from the router using a second multicast routing protocol requests for the first and second types of multicast traffic, receiving in the router the first and second types of multicast traffic comprising first and second IP packets, respectively, modifying in the router one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets via the first network interface, wherein the router transmits in a first time interval a portion of the first IP packets via the first network interface, transmits in a second time interval following the first time interval all or a portion of the modified second IP packets via the first network interface, and transmits in a third time interval following the second time interval some or all of the remaining portion of the first IP packets via the first network interface.

2. A method according to claim 1, wherein the first request corresponds to a first plurality of hosts that is associated with a first geographic area.

3. A method according to claim 1, wherein the router transmits in a first time interval all of the first IP packets via the first network interface and transmits in a second time interval following the first time interval all or a portion of the modified second IP packets via the first network interface.

4. A method according to claim 1, wherein the router transmits in a first time interval all of the modified second IP packets via the first network interface and transmits in a second time interval following the first time interval all or a portion of the first IP packets via the first network interface.

5. A method according to claim 1, wherein the first multicast routing protocol is based on the IGMP or MLD protocol.

6. A method according to claim 1, wherein the second multicast routing protocol is a based on the PIM protocol.

7. A method according to claim 1, wherein the first type of multicast traffic is designated as multicast traffic sent from a first source to a first multicast group address.

8. A method according to claim 7, wherein the second type of multicast traffic is designated as multicast traffic sent from the first source to a second multicast group address.

9. A method according to claim 7, wherein the second type of multicast traffic is designated as multicast traffic sent from a second source to the first multicast group address.

10. A method according to claim 7, wherein the second type of multicast traffic is designated as multicast traffic sent from a second source to a second multicast group address.

11. A method according to claim 1, wherein in the first type of multicast traffic is designated as multicast traffic sent from one or more first sources to a first multicast group address.

12. A method according to claim 11, wherein the second type of multicast traffic is designated as multicast traffic sent from the one or more first sources to a second multicast group address.

13. A method according to claim 11, wherein the second type of multicast traffic is designated as multicast traffic sent from one or more second sources to the first multicast group address.

14. A method according to claim 11, wherein the second type of multicast traffic is designated as multicast traffic sent from one or more second sources to a second multicast group address.

15. A method according to claim 1, wherein the first type of multicast traffic is designated as multicast traffic from a first multicast group.

16. A method according to claim 1, wherein association information of the first and second types of multicast traffic is configured by use of a version of the SNMP protocol.

17. A method comprising: receiving in a first network interface of a router a first request for a first type of multicast traffic in a first multicast routing protocol, storing in the router for the first network interface and the first type of multicast traffic a second type of multicast traffic, transmitting from the router using a second multicast routing protocol requests for the first and second types of multicast traffic, receiving in the router the first and second types of multicast traffic comprising first and second IP packets, respectively, modifying in the router one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets via the first network interface; receiving in a second network interface of the router a second request for the first type of multicast traffic in the first multicast routing protocol, storing in the router for the second network interface and the first type of multicast traffic a third type of multicast traffic, transmitting from the router using a second multicast routing protocol requests for the first and third types of multicast traffic, receiving in the router the first and third types of multicast traffic comprising first and third IP packets, respectively, modifying in the router one or both of the IP source address and the IP multicast destination address of some or all of the third IP packets so that the IP source address and the IP multicast destination address of some or all of the third IP packets are the same as the first IP packets of the first type of multicast traffic, transmitting the first IP packets and the modified third IP packets via the second network interface.

18. A method according to claim 17, wherein the first request corresponds to a first plurality of hosts and the second request corresponds to a second plurality of hosts.

19. A method according to claim 18, wherein the first plurality of hosts is associated with a first geographic area and the second plurality of hosts is associated with a second geographic area.

20. A method according to claim 17, wherein the router transmits in a first time interval a portion of the first IP packets via the first network interface, transmits in a second time interval following the first time interval all or a portion of the modified second IP packets via the first network interface, and transmits in a third time interval following the second time interval some or all of the remaining portion of the first IP packets via the first network interface.

21. A method according to claim 17, wherein the router transmits in a first time interval a portion of the first IP packets via the second network interface, transmits in a second time interval following the first time interval all or a portion of the modified third IP packets via the second network interface, and transmits in a third time interval following the second time interval some or all of the remaining portion of the first IP packets via the second network interface.

22. A method according to claim 17, wherein the router transmits in a first time interval a portion of the first IP packets via the first network interface, transmits in a second time interval following the first time interval all or a portion of the modified second IP packets via the first network interface, transmits in a third time interval following the second time interval some or all of the remaining portion of the first IP packets via the first network interface, transmits in a fourth time interval a portion of the first IP packets via the second network interface, transmits in a fifth time interval following the fourth time interval all or a portion of the modified third IP packets via the second network interface, and transmits in a sixth time interval following the fifth time interval some or all of the remaining portion of the first IP packets via the second network interface.

23. A method according to claim 22, wherein the first time interval and fourth time interval are the same.

24. A method according to claim 17, wherein the router transmits in a first time interval all of the first IP packets via the first network interface and transmits in a second time interval following the first time interval all or a portion of the modified second IP packets via the first network interface.

25. A method according to claim 17, wherein the router transmits in a first time interval all of the first IP packets via the second network interface and transmits in a second time interval following the first time interval all or a portion of the modified third IP packets via the second network interface.

26. A method according to claim 17, wherein the router transmits in a first time interval all of the first IP packets via the first network interface, transmits in a second time interval following the first time interval all or a portion of the modified second IP packets via the first network interface, transmits in a third time interval all of the first IP packets via the second network interface and transmits in a fourth time interval following the third time interval all or a portion of the modified third IP packets via the second network interface.

27. A method according to claim 26, wherein the first time interval and third time interval are the same.

28. A method according to claim 17, wherein the router transmits in a first time interval all of the modified second IP packets via the first network interface and transmits in a second time interval following the first time interval all or a portion of the first IP packets via the first network interface.

29. A method according to claim 17, wherein the router transmits in a first time interval all of the modified third IP packets via the second network interface and transmits in a second time interval following the first time interval all or a portion of the first IP packets via the second network interface.

30. A method according to claim 17, wherein the router transmits in a first time interval all of the modified second IP packets via the first network interface, transmits in a second time interval following the first time interval all or a portion of the first IP packets via the first network interface, transmits in a third time interval all of the third modified IP packets via the second network interface and transmits in a fourth time interval following the third time interval all or a portion of the first IP packets via the second network interface.

31. A method according to claim 17, wherein the first multicast routing protocol is based on the IGMP or MLD protocol.

32. A method according to claim 17, wherein the second multicast routing protocol is a based on the PIM protocol.

33. A method according to claim 17, wherein in the first type of multicast traffic is designated as multicast traffic sent from a first source to a first multicast group address.

34. A method according to claim 33, wherein the second type of multicast traffic is designated as multicast traffic sent from the first source to a second multicast group address.

35. A method according to claim 33, wherein the third type of multicast traffic is designated as multicast traffic sent from the first source to a third multicast group address.

36. A method according to claim 33, wherein the second type of multicast traffic is designated as multicast traffic sent from the first source to a second multicast group address and the third type of multicast traffic is designated as multicast traffic sent from the first source to a third multicast group address.

37. A method according to claim 33, wherein the second type of multicast traffic is designated as multicast traffic sent from a second source to the first multicast group address.

38. A method according to claim 33, wherein the third type of multicast traffic is designated as multicast traffic sent from a third source to the first multicast group address.

39. A method according to claim 33, wherein the second type of multicast traffic is designated as multicast traffic sent from a second source to the first multicast group address and the third type of multicast traffic is designated as multicast traffic sent from a third source to the first multicast group address.

40. A method according to claim 33, wherein the second type of multicast traffic is designated as multicast traffic sent from a second source to a second multicast group address.

41. A method according to claim 33, wherein the third type of multicast traffic is designated as multicast traffic sent from a third source to a third multicast group address.

42. A method according to claim 33, wherein the second type of multicast traffic is designated as multicast traffic sent from a second source to a second multicast group address and the third type of multicast traffic is designated as multicast traffic sent from a third source to a third multicast group address.

43. A method according to claim 17, wherein in the first type of multicast traffic is designated as multicast traffic sent from one or more first sources to a first multicast group address.

44. A method according to claim 43, wherein the second type of multicast traffic is designated as multicast traffic sent from the one or more first sources to a second multicast group address.

45. A method according to claim 43, wherein the third type of multicast traffic is designated as multicast traffic sent from the one or more first sources to a third multicast group address.

46. A method according to claim 43, wherein the second type of multicast traffic is designated as multicast traffic sent from the one or more first sources to a second multicast group address and the third type of multicast traffic is designated as multicast traffic sent from the one or more first sources to a third multicast group address.

47. A method according to claim 43, wherein the second type of multicast traffic is designated as multicast traffic sent from one or more second sources to the first multicast group address.

48. A method according to claim 43, wherein the third type of multicast traffic is designated as multicast traffic sent from one or more third sources to the first multicast group address.

49. A method according to claim 43, wherein the second type of multicast traffic is designated as multicast traffic sent from one or more second sources to the first multicast group address and the third type of multicast traffic is designated as multicast traffic sent from one or more third sources to the first multicast group address.

50. A method according to claim 43, wherein the second type of multicast traffic is designated as multicast traffic sent from one or more second sources to a second multicast group address.

51. A method according to claim 43, wherein the third type of multicast traffic is designated as multicast traffic sent from one or more third sources to a third multicast group address.

52. A method according to claim 43, wherein the second type of multicast traffic is designated as multicast traffic sent from one or more second sources to a second multicast group address and the third type of multicast traffic is designated as multicast traffic sent from one or more third sources to a third multicast group address.

53. A method according to claim 17, wherein the first type of multicast traffic is designated as multicast traffic from a first multicast group.

54. A method according to claim 17, wherein association information of the first and second types of multicast traffic is configured by use of a version of the SNMP protocol.

55. A method according to claim 17, wherein association information of the first and third types of multicast traffic is configured by use of a version of the SNMP protocol.

56. A method according to claim 17, wherein association information of the first and second types of multicast traffic and the first and third types of multicast traffic is configured by use of a version of the SNMP protocol.

57. A method comprising: receiving in a router a first request for a first type of multicast traffic in a first multicast routing protocol, the first request corresponding to a first plurality of hosts, receiving in the router a second request for the first type of multicast traffic in the first multicast routing protocol, the second request corresponding to a second plurality of hosts, associating in the router the first type of multicast traffic with a second type of multicast traffic based on information in the first request, associating in the router the first type of multicast traffic with a third type of multicast traffic based on information in the second request, transmitting from the router using a second multicast routing protocol requests for the first, second and third types of multicast traffic, receiving in the router the first, second and third types of multicast traffic, the received first, second and third types of multicast traffic comprising first, second and third IP packets, respectively, modifying in the router one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets toward the first plurality of hosts, and modifying in the router one or both of the IP source address and the IP multicast destination address of some or all of the third IP packets so that the IP source address and the IP multicast destination address of some or all of the third IP packets are the same as the first IP packets of the first type of multicast traffic, transmitting the first IP packets and the modified third IP packets toward the second plurality of hosts.

58. A method according to claim 57, wherein the first plurality of hosts is associated with a first geographic area and the second plurality of hosts is associated with a second geographic area.

59. A method according to claim 57, wherein the router transmits in a first time interval a portion of the first IP packets, transmits in a second time interval following the first time interval all or a portion of the modified second IP packet, and transmits in a third time interval following the second time interval some or all of the remaining portion of the first IP packets.

60. A method according to claim 57, wherein the router transmits in a first time interval a portion of the first IP packets, transmits in a second time interval following the first time interval all or a portion of the modified third IP packets, and transmits in a third time interval following the second time interval some or all of the remaining portion of the first IP packets.

61. A method according to claim 57, wherein the router transmits in a first time interval a portion of the first IP packets, transmits in a second time interval following the first time interval all or a portion of the modified second IP packets, transmits in a third time interval following the second time interval some or all of the remaining portion of the first IP packets, transmits in a fourth time interval a portion of the first IP packets, transmits in a fifth time interval following the fourth time interval all or a portion of the modified third IP packets, and transmits in a sixth time interval following the fifth time interval some or all of the remaining portion of the first IP packets.

62. A method according to claim 61, wherein the first time interval and fourth time interval are the same.

63. A method according to claim 57, wherein the router transmits in a first time interval all of the first IP packets and transmits in a second time interval following the first time interval all or a portion of the modified second IP packets.

64. A method according to claim 57, wherein the router transmits in a first time interval all of the first IP packets and transmits in a second time interval following the first time interval all or a portion of the modified third IP packets.

65. A method according to claim 57, wherein the router transmits in a first time interval all of the first IP packets, transmits in a second time interval following the first time interval all or a portion of the modified second IP packets, transmits in a third time interval all of the first IP packets and transmits in a fourth time interval following the third time interval all or a portion of the modified third IP packets.

66. A method according to claim 65, wherein the first time interval and third time interval are the same.

67. A method according to claim 57, wherein the router transmits in a first time interval all of the modified second IP packets and transmits in a second time interval following the first time interval all or a portion of the first IP packets.

68. A method according to claim 57, wherein the router transmits in a first time interval all of the modified third IP packets and transmits in a second time interval following the first time interval all or a portion of the first IP packets.

69. A method according to claim 57, wherein the router transmits in a first time interval all of the modified second IP packets, transmits in a second time interval following the first time interval all or a portion of the first IP packets, transmits in a third time interval all of the third modified IP packets and transmits in a fourth time interval following the third time interval all or a portion of the first IP packets.

70. A method according to claim 57, wherein the first multicast routing protocol is based on the IGMP or MLD protocol.

71. A method according to claim 57, wherein the second multicast routing protocol is a based on the PIM protocol.

72. A method according to claim 57, wherein in the first type of multicast traffic is designated as multicast traffic sent from a first source to a first multicast group address.

73. A method according to claim 72, wherein the second type of multicast traffic is designated as multicast traffic sent from the first source to a second multicast group address.

74. A method according to claim 72, wherein the third type of multicast traffic is designated as multicast traffic sent from the first source to a third multicast group address.

75. A method according to claim 72, wherein the second type of multicast traffic is designated as multicast traffic sent from the first source to a second multicast group address and the third type of multicast traffic is designated as multicast traffic sent from the first source to a third multicast group address.

76. A method according to claim 72, wherein the second type of multicast traffic is designated as multicast traffic sent from a second source to the first multicast group address.

77. A method according to claim 72, wherein the third type of multicast traffic is designated as multicast traffic sent from a third source to the first multicast group address.

78. A method according to claim 72, wherein the second type of multicast traffic is designated as multicast traffic sent from a second source to the first multicast group address and the third type of multicast traffic is designated as multicast traffic sent from a third source to the first multicast group address.

79. A method according to claim 72, wherein the second type of multicast traffic is designated as multicast traffic sent from one or more second sources to the first multicast group address and the third type of multicast traffic is designated as multicast traffic sent from one or more third sources to the first multicast group address.

80. A method according to claim 72, wherein the second type of multicast traffic is designated as multicast traffic sent from a second source to a second multicast group address.

81. A method according to claim 72, wherein the third type of multicast traffic is designated as multicast traffic sent from a third source to a third multicast group address.

82. A method according to claim 72, wherein the second type of multicast traffic is designated as multicast traffic sent from a second source to a second multicast group address and the third type of multicast traffic is designated as multicast traffic sent from a third source to a third multicast group address.

83. A method according to claim 57, wherein in the first type of multicast traffic is designated as multicast traffic sent from one or more first sources to a first multicast group address.

84. A method according to claim 83, wherein the second type of multicast traffic is designated as multicast traffic sent from the one or more first sources to a second multicast group address.

85. A method according to claim 83, wherein the third type of multicast traffic is designated as multicast traffic sent from the one or more first sources to a third multicast group address.

86. A method according to claim 83, wherein the second type of multicast traffic is designated as multicast traffic sent from the one or more first sources to a second multicast group address and the third type of multicast traffic is designated as multicast traffic sent from the one or more first sources to a third multicast group address.

87. A method according to claim 83, wherein the second type of multicast traffic is designated as multicast traffic sent from one or more second sources to the first multicast group address.

88. A method according to claim 83, wherein the third type of multicast traffic is designated as multicast traffic sent from one or more third sources to the first multicast group address.

89. A method according to claim 83, wherein the second type of multicast traffic is designated as multicast traffic sent from one or more second sources to a second multicast group address.

90. A method according to claim 83, wherein the third type of multicast traffic is designated as multicast traffic sent from one or more third sources to a third multicast group address.

91. A method according to claim 83, wherein the second type of multicast traffic is designated as multicast traffic sent from one or more second sources to a second multicast group address and the third type of multicast traffic is designated as multicast traffic sent from one or more third sources to a third multicast group address.

92. A method according to claim 57, wherein the first type of multicast traffic is designated as multicast traffic from a first multicast group.

93. A method according to claim 57, wherein association information of the first and second types of multicast traffic is configured by use of a version of the SNMP protocol.

94. A method according to claim 57, wherein association information of the first and third types of multicast traffic is configured by use of a version of the SNMP protocol.

95. A method according to claim 57, wherein association information of the first and second types of multicast traffic and the first and third types of multicast traffic is configured by use of a version of the SNMP protocol.

96. A method comprising: an application generating in a host a first request for a first type of multicast traffic, associating in the host the first type of multicast traffic with a second type of multicast traffic, generating in the host a second request for the second type of multicast traffic, transmitting from the host the first and second requests, receiving in the host the first and second types of multicast traffic comprising first and second IP packets, respectively; and modifying in the host one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets to the application requesting the first type of multicast traffic, wherein in a first time interval a portion of the first IP packets are transmitted to the application, in a second time interval following the first time interval all or a portion of the modified second IP packets are transmitted to the application, and in a third time interval following the second time interval some or all of the remaining portion of the first IP packets are transmitted to the application.

97. A method according to claim 96, wherein associating the first type of traffic with the second type of traffic is based on information stored in the host.

98. A method according to claim 96, wherein the host stores information to associate the first type of multicast traffic with the second type of multicast traffic, the information being dynamic such that in a first time period and a second time period the second type of multicast traffic is different.

99. A method according to claim 98, wherein the information changes according to a location of the host.

100. A method according to claim 98, wherein the information changes according to a change of data stored in the host.

101. A method according to claim 96, wherein an operating system of the hosts modifies one or both of the IP source address and the IP multicast destination address of some or all of the second IP packets.

102. A method according to claim 96, wherein the host executes a specific software application that comprises executable instructions that when executed in the host associates the first type of multicast traffic with the second type of multicast traffic.

103. A method according to claim 96, wherein the specific software application receives the information of the second type of multicast traffic from a unicast or multicast communication.

104. A method according to claim 96, wherein the specific software application modifies one or both of the IP source address and the IP multicast destination address of some or all of the second IP packets.

105. A method according to claim 96, wherein the first and second requests are in the form of IGMP or MLD protocol messages.

106. A method according to claim 96, wherein the first type of multicast traffic is designated as multicast traffic sent from a first source to a first multicast group address.

107. A method according to claim 106, wherein the second type of multicast traffic is designated as multicast traffic sent from the first source to a second multicast group address.

108. A method according to claim 106, wherein the second type of multicast traffic is designated as multicast traffic sent from a second source to the first multicast group address.

109. A method according to claim 106, wherein the second type of multicast traffic is designated as multicast traffic sent from a second source to a second multicast group address.

110. A method according to claim 96, wherein in the first type of multicast traffic is designated as multicast traffic sent from one or more first sources to a first multicast group address.

111. A method according to claim 110, wherein the second type of multicast traffic is designated as multicast traffic sent from the one or more first sources to a second multicast group address.

112. A method according to claim 110, wherein the second type of multicast traffic is designated as multicast traffic sent from one or more second sources to the first multicast group address.

113. A method according to claim 110, wherein the second type of multicast traffic is designated as multicast traffic sent from one or more second sources to a second multicast group address.

114. A method according to claim 96, wherein the first type of multicast traffic is designated as multicast traffic from a first multicast group.

115. A method comprising: an application generating in a host a first request for a first type of multicast traffic, associating in the host the first type of multicast traffic with a second type of multicast traffic, generating in the host a second request for the second type of multicast traffic, transmitting from the host the first and second requests, receiving in the host the first and second types of multicast traffic comprising first and second IP packets, respectively; and modifying in the host one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets to the application requesting the first type of multicast traffic, wherein in a first time interval all of the first IP packets are transmitted to the application and in a second time interval following the first time interval all or a portion of the modified second IP packets are transmitted to the application.

116. A method comprising: an application generating in a host a first request for a first type of multicast traffic, associating in the host the first type of multicast traffic with a second type of multicast traffic, generating in the host a second request for the second type of multicast traffic, transmitting from the host the first and second requests, receiving in the host the first and second types of multicast traffic comprising first and second IP packets, respectively; and modifying in the host one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets to the application requesting the first type of multicast traffic, wherein in a first time interval all of the modified second IP packets are transmitted to the application and in a second time interval following the first time interval all or a portion of the first IP packets are transmitted to the first application.

117. A method comprising: an application generating in a host a first request for a first type of multicast traffic, transmitting from the host the first request, receiving in the host the first type of multicast traffic comprising first IP packets, associating in the host the first type of multicast traffic with a second type of multicast traffic based on information in at least one of the first IP packets, generating in the host a second request for the second type of multicast traffic, transmitting from the host second request, receiving in the host the second type of multicast traffic comprising second IP packets; and modifying in the host one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets to the application requesting the first type of multicast traffic, wherein in a first time interval a portion of the first IP packets are transmitted to the application, in a second time interval following the first time interval all or a portion of the modified second IP packets are transmitted to the application, and in a third time interval following the second time interval some or all of the remaining portion of the first IP packets are transmitted to the application.

118. A method according to claim 117, wherein the first and second requests are in the form of IGMP or MLD protocol messages.

119. A method according to claim 117, wherein the first type of multicast traffic is designated as multicast traffic sent from a first source to a first multicast group address.

120. A method according to claim 119, wherein the second type of multicast traffic is designated as multicast traffic sent from the first source to a second multicast group address.

121. A method according to claim 119, wherein the second type of multicast traffic is designated as multicast traffic sent from a second source to the first multicast group address.

122. A method according to claim 119, wherein the second type of multicast traffic is designated as multicast traffic sent from a second source to a second multicast group address.

123. A method according to claim 117, wherein in the first type of multicast traffic is designated as multicast traffic sent from one or more first sources to a first multicast group address.

124. A method according to claim 123, wherein the second type of multicast traffic is designated as multicast traffic sent from the one or more first sources to a second multicast group address.

125. A method according to claim 123, wherein the second type of multicast traffic is designated as multicast traffic sent from one or more second sources to the first multicast group address.

126. A method according to claim 123, wherein the second type of multicast traffic is designated as multicast traffic sent from one or more second sources to a second multicast group address.

127. A method according to claim 117, wherein the first type of multicast traffic is designated as multicast traffic from a first multicast group.

128. A method comprising: an application generating in a host a first request for a first type of multicast traffic, transmitting from the host the first request, receiving in the host the first type of multicast traffic comprising first IP packets, associating in the host the first type of multicast traffic with a second type of multicast traffic based on information in at least one of the first IP packets, generating in the host a second request for the second type of multicast traffic, transmitting from the host second request, receiving in the host the second type of multicast traffic comprising second IP packets; and modifying in the host one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets to the application requesting the first type of multicast traffic, wherein in a first time interval all of the first IP packets are transmitted to the application and in a second time interval following the first time interval all or a portion of the modified second IP packets are transmitted to the application.

129. A method comprising: an application generating in a host a first request for a first type of multicast traffic, transmitting from the host the first request, receiving in the host the first type of multicast traffic comprising first IP packets, associating in the host the first type of multicast traffic with a second type of multicast traffic based on information in at least one of the first IP packets, generating in the host a second request for the second type of multicast traffic, transmitting from the host second request, receiving in the host the second type of multicast traffic comprising second IP packets; and modifying in the host one or both of the IP source address and the IP multicast destination address of some or all of the second IP packets so that the IP source address and the IP multicast destination address of some or all of the second IP packets are the same as the first IP packets of the first type of multicast traffic and transmitting the first IP packets and the modified second IP packets to the application requesting the first type of multicast traffic, wherein in a first time interval all of the modified second IP packets are transmitted to the application and in a second time interval following the first time interval all or a portion of the first IP packets are transmitted to the first application.

\* \* \* \* \*